United States Patent
Ishikawa et al.

(10) Patent No.: US 6,805,924 B1
(45) Date of Patent: Oct. 19, 2004

(54) COMPENSATION FILMS FOR LCD

(75) Inventors: Tomohiro Ishikawa, Rocheser, NY (US); Xiang-Dong Mi, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/413,331

(22) Filed: Apr. 14, 2003

(51) Int. Cl.[7] ............................................. G02F 1/1335
(52) U.S. Cl. ................... 428/1.1; 349/117; 349/118; 349/119; 349/120; 349/121
(58) Field of Search .................... 428/1.1, 1.3, 1.6; 349/117–121

(56) References Cited

U.S. PATENT DOCUMENTS

| | | | |
|---|---|---|---|
| 5,557,434 A | * | 9/1996 | Winker et al. ............... 349/117 |
| 5,589,963 A | * | 12/1996 | Gunning et al. ............. 349/119 |
| 5,594,568 A | * | 1/1997 | Abileah et al. ............. 349/120 |
| 5,619,352 A | | 4/1997 | Koch et al. ................ 349/89 |
| 5,737,048 A | * | 4/1998 | Abileah et al. ............. 349/121 |
| 5,777,709 A | * | 7/1998 | Xu ............................. 349/120 |
| 5,907,378 A | * | 5/1999 | Abileah et al. ............. 349/123 |
| 6,028,651 A | * | 2/2000 | Abileah et al. ............. 349/123 |
| 6,169,590 B1 | * | 1/2001 | Abileah et al. ............. 349/120 |
| 6,229,588 B1 | * | 5/2001 | Abileah et al. ............. 349/120 |
| 6,359,671 B1 | * | 3/2002 | Abileah ....................... 349/119 |

FOREIGN PATENT DOCUMENTS

| | | |
|---|---|---|
| EP | 1 143 271 | 10/2001 |
| WO | WO 97/44409 | 11/1997 |

OTHER PUBLICATIONS

J. Chen, et al, "Wide Viewing Angle Photoaligned Plastic Films for TN–LCDS" SID 99, pp. 98–101.
X. Mi, "Compensation Films for LCDs", USSN 10/281,595, (D–84990) filed Oct. 28, 2002.
* cited by examiner Primary Examiner—Harold Pyon
Assistant Examiner—Sow-Fun Hon
(74) Attorney, Agent, or Firm—Arthur E. Kluegel

(57) ABSTRACT

An optical compensation film for Ordinary-mode Normally White Twisted Nematic Liquid Crystal Display comprising, a first and a second optically anisotropic layers containing positively birefringent material disposed on a substrate, wherein the optic axis of said first optically anisotropic layer tilts in a first plane with an average tilt angle between 10° and 60°, and the optic axis of said second optically anisotropic layer tilts in a second plane with an average tilt angle between 0° and 30°, and said average tilt angle of said first optically anisotropic layer and said average tilt angle of said second optically anisotropic layer are different, and said first and said second planes are perpendicular to the plane of said optical compensation film with the angle between said first and said second planes being 90±10°, and the retardation defined by $(ne_1-no_1)d_1$ of said first optically anisotropic layer is between 60 nm and 220 nm and the retardation defined by $(ne_2-no_2)d_2$ of the said second optically anisotropic layers is between 85 nm and 210 nm.

24 Claims, 17 Drawing Sheets

COMPENSATION FILMS FOR LCD

CROSS REFERENCE TO RELATED APPLICATIONS

Reference is made to commonly-assigned U.S. patent application Ser. No. 10/318,773, titled COMPENSATION FOR LCDS, abandoned Jun. 16, 2003, the disclosure of which is incorporated herein.

FIELD OF THE INVENTION

The present invention relates to an optical compensation film useful for application to a liquid crystal display, particularly to an Ordinary-mode Normally White Twisted Nematic Liquid Crystal Display. It comprises two layers having retardation values and different tilt angles both within prescribed limitations.

BACKGROUND OF THE INVENTION

The following terms have the definitions as stated below.
Optic axis herein refers to the direction in which propagating light does not see birefringence.
A-plate, C-plate and O-plate herein are the plates in which the optic axis is in the plane of the plate, perpendicular to the plate and tilted with respect to the plane of the plate, respectively.
Polarizer and Analyzer herein refer to elements that polarize electromagnetic wave. However, one closer to the source of the light will be called polarizer while the one closer to the viewer will be called analyzer. Polarizing elements herein refers to both of polarizer and analyzer.
Viewing direction herein is defined us a set of polar viewing angle $\alpha$ and azimuthal viewing angle $\beta$ as shown in FIG. 1 with respect to a liquid crystal display 101. The polar viewing angle $\alpha$ is measured from display normal direction 103 and the azimuthal viewing angle $\beta$ spans between an appropriate reference direction 105 in the plane of the display surface 107 and the projection 108 of the arrow 109 onto the display surface 107. Various display image properties, such as contrast ratio, color and brightness are functions of angles $\alpha$ and $\beta$.
Azimuthal angle $\phi$ and tilt angle $\theta$ are herein used to specify the direction of an optic axis. For the transmission axes of the polarizer and the analyzer, only the azimuthal angle $\phi$ is used, as their tilt angle $\theta$ is zero. FIG. 2 shows the definition of the azimuthal angle $\phi$ and tilt angle $\theta$ to specify the direction of the optic axis 201 with respect to the x-y-z coordinate system 203. The x-y plane is parallel to the display surface 107, and the z-axis is parallel to the display normal direction 103. The azimuthal angle $\phi$ is the angle between the x-axis and the projection of the optic axis 201 onto the x-y plane. The tilt angle $\theta$ is the angle between the optic axis 201 and the x-y plane.
ON (OFF) state herein refers to the state with (without) an applied electric field to the liquid crystal display 101.
Isocontrast plot herein shows a change in a contrast ratio from different viewing directions. Isocontrast line, on which the contrast ratio is constant (such as 10, 50 and 100), is plotted in polar format. The concentric circle corresponds to polar viewing angle $\alpha=20°, 40°, 60°$ and $80°$ (outer most circle) and the radial lines indicates azimuthal viewing angle $\beta=0°, 45°, 90°, 135°, 180°, 225°, 270°$ and $315°$. The area enclosed within the isocontrast line with contrast ratio, for example, 10 is the viewing angle range with contrast ratio 10 or higher.
Lamination herein means a process of making a single sheet of film by uniting two or more films.
Ordinary-Mode Twisted Nematic Liquid Crystal Display herein means a Twisted Nematic Liquid Crystal Display having the direction of the liquid crystal optic axis at cell surface 311 (or 312) substantially perpendicular to the transmission axis direction of the adjacent polarizing element 307 (or 309).

Liquid crystals are widely used for electronic displays. In these display systems, a liquid crystal cell is typically situated between a pair of polarizer and analyzers, An incident light polarized by the polarizer passes through a liquid crystal cell and is affected by the molecular orientation of the liquid crystal, which can be altered by the application of a voltage across the cell. The altered light goes into the analyzer. By employing this principle, the transmission of light from an external source, including ambient light, can be controlled. The energy required to achieve this control is generally much less than required for the luminescent materials used in other display types such as cathode ray tubes (CRT). Accordingly, liquid crystal technology is used for a number of electronic imaging devices, including but not limited to digital watches, calculators, portable computers, electronic games for which light-weight, low-power consumption and long-operating life are important features.

Contrast, color reproduction, and stable gray scale intensities are important quality attributes for electronic displays, which employ liquid crystal technology. The primary factor limiting the contrast of a liquid crystal display (LCD) is the propensity for light to "leak" through liquid crystal elements or cells, which are in the dark or "black" pixel state. Furthermore, the leakage and hence contrast of a liquid crystal display are also dependent on the direction from which the display screen is viewed. Typically the optimum contrast is observed only within a narrow viewing angle range centered about the normal incidence ($\alpha=0°$) to the display and falls off rapidly as the polar viewing angle $\alpha$ is increased. In color displays, the leakage problem not only degrades the contrast but also causes color or hue shifts with an associated degradation of color reproduction.

LCDs are quickly replacing CRTs as nonitors for desktop computers and other office or house hold appliances. It is also expected that the number of LCD television monitors with a larger screen size will sharply increase in the near future. However, unless problems of viewing angle dependence such as coloration, degradation in contrast, and an inversion of brightness are solved, LCD's application as a replacement of the traditional CRT will be limited.

Among various LCD modes, Twisted Nematic (TN) LCD is one of the most prevalent ones. FIG. 3A is a schematic of a TN-LCD 313. A liquid cell 301 is positioned between a polarizer 303 and an analyzer 305. Their transmission axes 307, 309 are crossed, meaning that the transmission (or equivalently, absorption) axes of a polarizer and an analyzer form angle 90±10°. Inside the liquid crystal cell, the optic axis of liquid crystal shows azimuthal rotation of 90° in the OFF state across the cell thickness direction. In FIG. 3A, the direction of the liquid crystal optic axes 311, 312 at the cell surfaces is indicated by a single head arrow. At the surface, the liquid crystal optic axes 311, 312 have a small tilt angle $\theta_s$ with respect to the cell surfaces in order to prevent the reverse twist. Namely, the tilt is consistent with the sense (clock or counter-clock wise) of the azimuthal rotation in the liquid crystal optic axis in the cell thickness direction. The azimuthal angle between the of transmission axes 307 of the polarizer 303 and the optic axis 311 of the liquid crystal on the nearest cell surface is 90°. The same relation holds for the transmission axis 309 of the analyzer 305 and the liquid crystal optic axis 312 at the cell surface. Un-polarized incoming light is linearly polarized by the polarizer 303 and its plane of polarization rotates 90° while traveling through the liquid crystal cell 301. The plane of polarization of out-coming light from the cell 301 is parallel to the transmission axis 309 of analyzer 305 and will transmit through the analyzer 305. With sufficiently high-applied voltage, the liquid crystal becomes perpendicular to the cell plane except in the close vicinity of the bounding plates. In this ON state, the incoming polarized light essentially does not see birefringence and thus it is blocked by the analyzer. This mode of bright OFF state and dark ON state combined with the angular relation between liquid crystal optic axes at the cell surfaces and transmission axes of the polarizing elements is called Ordinary-mode Normally White Twisted Nematic Liquid Crystal Display (O-mode NW-TN-LCD). On the other hand, if the transmission axes of polarizing elements are parallel to the liquid crystal optic axis of the nearest cell surface, the corresponding display is called Extraordinary-mode Normally White Twisted Nematic Liquid Crystal Display (E-mode NW-TN-LCD). Most of the current applications of Normally White Liquid Crystal Display are that of O-mode.

In the display normal viewing direction ($\alpha=0°$), one can obtain high contrast between the ON and OFF states. However, when the display is viewed from an oblique direction, the propagating light sees birefringence in ON state, thus it is not completely blocked by the analyzer. The isocontrast plot of the display 313 is shown in FIG. 3B. The lines 315, 317, 319 are isocontrast lines for contrast ratios 10, 50 and 100, respectively. The azimuthal angle $\beta$ is measured from a reference direction 105 (shown in FIG. 1), which is chosen to be at 45° relative to the transmission axis 307 of the polarizer 303 (namely, $\beta 45°$, 225° line corresponds to 307). The display fails to maintain contrast ratio 10 or higher in the range required for many applications. Viewing angle range with contrast 10 or higher is limited as the area enclosed within the isocontrast line 10, 315, is small. The isocontrast line 10 runs through $\alpha=43°$ for the horizontal viewing direction ($\beta=0°$, 180°). In the vertical direction, $\alpha=30°$, 80° for $\beta=90°$, 270°, respectively. Within the viewing angle range outside of the line 315, the contrast ratio between the On and the Off state becomes less than 10.

One of the common methods to improve the viewing angle characteristic of TN-LCD is to use the compensation films. In some cases, the compensation films consist of optically anisotropic layer deposited on the substrate. The substrate can be flexible film such as triacetyl-cellulose or rigid such as glass. The optically anisotropic layer is generally made of liquid crystals polymers. As it is necessary to align the optic axis of the liquid crystal polymer in the desired direction (making the anisotropic layer as A, C or O-plate), an alignment layer is often deposited between the optically anisotropic layer and substrate or between the two optically anisotropic layers. The thickness of the anisotropic layer depends on the property of its constituent material and LCD to which it is applied. The compensation films are typically inserted anywhere between the liquid crystal cell and the polarizers. The function of compensation film, in general, is to undo the retardation experienced by the propagating light while traveling through the liquid crystal cell. By using the compensation film in the ON state of O-mode NW-TN-LCD, birefringence experienced by the obliquely propagating light is cancelled by the film. This gives us uniform dark state resulting in improved viewing angle characteristic.

Various compensation methods have been suggested. U.S. Pat. No. 5,619,352 discloses the usage of combinations of O-plates. The basic idea is to compensate the ON state of TN-LCD by a stack of O-plates that have similar or complementary optical symmetries of the ON state liquid crystal cell. This was done by approximating the ON state of TN-LCD by three representative parts: two regions closed to the cell bounding plates and cell middle section. In the middle of the cell, the liquid crystal optic axis is almost perpendicular to the cell plane with large change in the azimuthal angle of liquid crystal optic axis. In the vicinity of the bounding plates, tilt in liquid crystal optic axis is small with almost fixed azimuthal angle. In comparison to the previous compensation technology, the stability of gray scale as well as viewing angle characteristic has been improved.

European Patent Application 1143271A2 discloses compensation film comprising two layers of O-plates. The tilt angle of optic axis increases continuously or stepwise in the film thickness direction in the first O-plate whereas it decreases continuously or stepwise in the second O-plate. These two O-plates are disposed on the substrate with negative C-plate property or biaxial plate having optical property close to that of negative C-plate. In negative C-plates, the ordinary refraction index is larger than the extraordinary one, and the optic axis is perpendicular to the plates. The film is used one side of the liquid crystal cell. The average tilt angle of two O-plates may assume different values. Examples 8 and 16, for example use combinations of average tilt angles 42° and 31°, and 20° and 89°, respectively.

Van de Witte et al. also disclosed in WO 97/44409 that the combination of two O-plates are used to compensate the Twisted Nematic Displays. The compensation films are applied for both sides of the liquid crystal cell. This case, too, the two O-plates can take different tilt angles, for example, 40° and 50°. The tilt angles are preferably larger than 10° but no more than 70°.

In EP 0854376 discloses the use of hybrid-aligned film to compensate O-mode NW-TN-LCDs. FIG. 4A shows the O-mode NW-TN-LCD 421 with two hybrid-aligned compensation films 407, 415 placed adjacent to the liquid crystal cell 409. In the hybrid-aligned films 407, 415, the optic axes 423, 424 change their tilt angles gradually in the film thickness direction while keeping their azimuthal angles constant. The tilt angle changes from a few degree to 80°, thus the average tilt angle is approximately 40°. The pair of hybrid-aligned film 407, 415 is placed such that azimuthal angle between the optic axes of compensation films and the liquid crystals optic axes 411, 413 of nearest cell surface is 90°. The azimuthal angle of transmission axes 403, 419 of the analyzer 401 and the polarizer 417 are equal to that of the optic axes 423, 424 of compensation films 407, 415, respectively. The thickness of the compensation films 407, 415 is 0.42 $\mu$m and the phase retardation values is 100 nm. The negative C-plates 405 represent the optical properties of tri-acetyl cellulose substrate. The retardation of the substrates 405 $R_{sub}$ with negative C-plate property defined by $R_{sub}=(n e_s-n o_s)d_s$ is −60 nm, where $ne_s$ and $no_s$ are extraordinary and ordinary indices of refraction, respectively and $d_s$ is the thickness of the substrate. FIG. 4B shows the isocontrast plot of the display 421. The lines 427, 429 and 431 are isocontrast lines of contrast ratios 10, 50 and 100, respectively. While gray scale inversion in the horizontal viewing direction ($\beta=0°$ and 180°) is improved (FIG. 9, in comparison to FIG. 10 in EP 0854376), the improvement in isocontrast plot is limited compared to the uncompensated display 313.

The compensation film disclosed in the co-pending U.S. patent application Ser. No. 10/318,773, uses two layers having different retardation values and different tilt angles both within prescribed limitations. It significantly improved the viewing angle of NW-TN-LCD. However, the application of the compensation film disclosed in the application is limited to E-mode NW-TN-LCD. The film gives unsatisfactory viewing angle characteristics when it is applied to O-mode NW-TN-LCD.

The prior art compensators using O-plate improved the viewing angle characteristic by reducing the light leakage in the ON state of O-mode NW-TN-LCD. However, viewing angle characteristic still remain unsatisfactory. For example, in the prior art display 421 shown in FIG. 4A, large viewing angle range with contrast ratio b 10or less (namely, the area outside of the isocontrast line 10, 427 in the isocontrast plot shown in FIG. 4B of prior art display 421 shown in FIG. 4A) remains. The display with this viewing angle characteristic is certainly not applicable for LCD-TV or application that needs large viewing angle range, such as avionics displays. Also, prior arts do not focus on the systematic optimizations of parameters, e.g., the retardation and tilt angle combination along with the optical properties of the substrate. Thus, the range of parameters that offers functional compensation films for O-mode NW-TN-LCD is limited. Therefore there is a strong need for new compensation films that offer significantly higher contrast for wider viewing angle range than the displays with prior art compensation films for O-mode NW-TN-LCD. Also, the need is there to have a wider range of parameters for compensation films that lead to flexible manufacturing conditions.

SUMMARY OF THE INVENTION

The invention provides an optical compensation film for Ordinary-mode Normally White Twisted Nematic Liquid Crystal Displays comprising, a first and a second optically anisotropic layers containing positively birefringent material disposed on a substrate, wherein the optic axis of said first optically anisotropic layer tilts in a first plane with an average tilt angle between 10° and 60°, and the optic axis of said second optically anisotropic layer tilts in a second plane with an average tilt angle between 0°and 30°, and said average tilt angle of said first optically anisotropic layer and said average tilt angle of said second optically anisotropic layer are different, and said first and said second planes are perpendicular to the plane of said optical compensation film with the angle between said first and said second planes being 90±10°, and the retardation defined by $(ne_1-no_1)d_1$ of said first optically anisotropic layer is between 60 nm and 220 nm and the retardation defined by $(ne_2-no_2)d_2$ of the said second optically anisotropic layers is between 85 nm and 210 m, where $ne_1$ and $no_1$ are extraordinary and ordinary indices of refraction of said positively birefringent material of said first optically anisotropic layer, respectively, and $ne_2$ and $no_2$ are extraordinary and ordinary indices of refraction of said positively birefringent material of said second optically anisotropic layer, respectively, and $d_1$ and $d_2$ are thickness of said first and said second optically anisotropic layer, respectively.

The compensation film can be used in conjunction with an Ordinary-mode Normally White Twisted Nematic Liquid Crystal Display for an improved viewing angle characteristic. The invention also includes a display incorporating the film of the invention.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

In FIG. 6A and FIG. 6C, the tilt angle of optic axis is constant, while in FIG. 6B, it varies in the film thickness direction. FIG. 6A and FIG. 6B show left-handed films, whereas FIG. 6C corresponds to a right-handed film.

DETAILED DESCRIPTION OF THE INVENTION

Reference will now be made to the drawings in which the various elements of the present invention will be given numerical designations and in which the invention will be discussed so as to enable one skilled in the art to make and use the invention. It is to be understood that elements not specifically shown or described may take various forms well known to those skilled in the art.

An optical compensation film for an Ordinary-mode Normally White Twisted Nematic Liquid Crystal Display of the present invention comprises a first and a second optically anisotropic layers containing positively birefringent material disposed on a substrate, wherein the optic axis of said first optically anisotropic layer tilts in a first plane with an average tilt angle between 10° and 60°, and the optic axis of said second optically anisotropic layer tilts in a second plane with an average tilt angle between 0° and 30°, and said average tilt angle of said first optically anisotropic layer and said average tilt angle of said second optically anisotropic layer are different, and said first and said second planes are perpendicular to a plane of said optical compensation film, and an angle between said first and said second plane is 90±10°, and the retardation defined by $(ne_1-no_1)d_1$ of said first optically anisotropic layer is between 60 nm and 220 nm and the retardation defined by $(ne_2-no_2)d_2$ of the said second optically anisotropic layers is between 85 nm and 210 nm, where net and no, are extraordinary and ordinary indices of refraction of said positively birefringent material of said first optically anisotropic layer, respectively, and $ne_2$ and $no_2$ are extraordinary and ordinary indices of refraction of said positively birefringent material of said second optically anisotropic layer, respectively, and $d_1$ and $d_2$ are thickness of the said first and said second optically anisotropic layer, respectively. In the following, the present invention will be explained in detail.

Figure 5A:
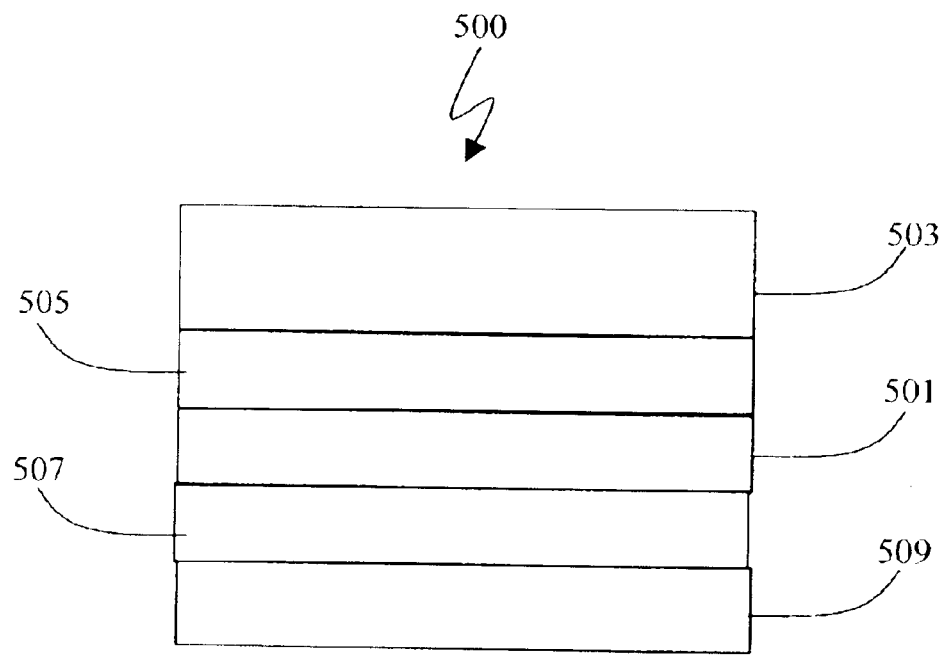
FIG. 5A, FIG. 5B, FIG. 5C and FIG. 5D are elevation schematics of the compensation film.

FIG. 5A shows the elevation view of the optical compensation film 500, which contains a positively birefringent material oriented with its optic axis tilted in a plane perpendicular to the film plane. Two birefringent material layers or optically anisotropic layers 501, 503 are deposited on the substrate 509, which is parallel to the film plane. The first layer 501 and second layer 503 have different average tilt angle in the optic axis. The average tilt angle $\theta_{av}$ is the average of tilt angle over the thickness of the optically anisotropic layer, i.e., $$\frac{\int_0^d \theta(z)dz}{d},$$

where $\theta(z)$ is the tilt angle at the height of z measured in the thickness direction of the optically anisotropic layers, 501, 503, with the thickness d. If the tilt angle is constant throughout the thickness direction of the anisotropic layer, namely $\theta(z)=\theta_C$, then we have $\theta_{av}=\theta_C$. If the tilt angle varies linearly throughout in the thickness direction of the optically anisotropic layer, $\theta_{av}$ is equal to the average of the tilt angle at z=0 and z=d, thus $\theta_{av}=\{\theta(z=0)+\theta(z=d)\}/2$. The retardation of optically anisotropic layer is defined by (ne−no)d at the wavelength of 550 nm, where ne and no are the extraordinary and ordinary refractive indices of the positively birefringent material, respectively, and d, the thickness of the birefringent material layer or optically anisotropic layer. Thus thickness of the two anisotropic layers with the same retardation must be equal provided their birefringence (ne−no) are the same. There are cases in which the two optically anisotropic layers contain different positively anisotropic materials. Namely, the first optically anisotropic layer contains positively birefringent material with $ne_1$ and $no_1$ while the second optically anisotropic layer contains positively birefringent material with $ne_2$ and $no_2$.

As is well known in the art, optical materials may have up to three different principal indices of refraction and can be classified as either isotropic or anisotropic based on the relationship of these indices. When all three of its principal indices are equal, a material is said to be isotropic. When anisotropic, a material can be either uniaxial, or biaxial. If two principal indices are equal, a material is called uniaxial. A uniaxial material is uniquely characterized, as having an ordinary index, referred as no, an extraordinary index ne and two angles describing the orientation of its optical axis, the axis of ne. When ne is greater than no, a uniaxial material is positively birefringent. When ne is smaller than no, a uniaxial material is negatively birefringent. Controlling birefringent behavior is particularly useful in the fabrication and application of optical films. When all three refractive indices are different, a material is said to be biaxial, uniquely specified by its principal indices $nx_0$, $ny_0$, $nz_0$, and three orientation angles. Some of biaxial materials show weak biaxiality meaning that two of their three principal indices are very close, which is often considered equally as the ordinary refractive index for a uniaxial material. In the following, "optically anisotropic layer" is used to refer the birefringent material layer.

The substrate 509 functions as a mechanical support and has certain optical property. The material for substrate can be polymer or other optically transparent material. The substrate can take flexible or rigid form as long as it has enough strength for manufacturing process and actual application. Optically, it has a characteristic of negative C-plate, namely, C-plate with a relation $ne_s<no_s$, where $ne_s$ and $no_s$ are extraordinary and ordinary refraction indices of substrate. The out-of-plane retardation $R_{sub}=(ne_s-no_s)d_s$ of the substrate defined at the wavelength of 550 nm with thickness $d_s$ is preferably in the range of −200 nm to −60 nm. A substrate with biaxial optical property can also be used. In this case, the optically property of the substrate is specified by three independent indices of refraction, $nx_s$, $ny_s$, and $nz_s$, where $nx_s$ is the maximum index of refraction and $ny_s$ is the minimum index refraction both in the plane of the substrate and $nz_s$ is the index of refraction in the thickness direction of the substrate. For the biaxial plate to be used as a substrate, the difference between $nx_s$ and $ny_s$ is small, that is $(nx_s-ny_s)/(nx_s+ny_s) \leq 0.05$, and the relation $nx_s>ny_s>nz_s$ is satisfied. In this case the out-of-plane retardation, $R_{sub}$ is defined by $R_{sub}=\{nz_s-(nx_s+ny_s)/2\}$ at the wavelength of 550 nm. The substrate can comprise of multiple of layers or coatings to attain the sufficient negative value of $R_{sub}$. For example, if a sheet of polymer film gives $R_{sub}=-60$ nm, one obtains $R_{sub}=-120$ nm by laminating two sheets of the same film. Or if necessary, films with insufficient negative value of $R_{sub}$ can be coated with a layer of organic or inorganic compound. As is well known to someone who is skilled in the art, a layer of particular polymer, such as polyimide or discotic liquid crystal compounds gives high negative value of $R_{sub}$. Optically isotropic materials, such as glass or some polymer films, can be a substrate when coated or laminated with layers or a layer having sufficient negative value of $R_{sub}$.

Alignment layers 505, 507 enforce the predetermined azimuthal $\phi$ and tilt $\theta$ angles of optic axis in the first and the second optically anisotropic layers 501, 503. In a typical case, the alignment direction is generated by mechanically rubbing the surface of the alignment layer. In general, the alignment layer contains a polymeric material such as polyvinyl alcohol or polyimide. By changing rubbing speed, rubbing pressure and other controllable parameters, one can generate prescribed angle of optic axis in the first and the second optically anisotropic layers 501, 503. Also, electromagnetic radiation of the alignment layer or photo-alignment method is known to generate the specific orientation of the optic axis. In this case, the direction of optic axis in the optically anisotropic layer is controlled by the material contained in the alignment layer, amount of an exposure, wavelength of the radiation, the thickness of alignment layer and other possible parameters. The alignment layer needs to be sensitive to the wavelength of radiation. Typically, a radiation in ultraviolet region is used for polymeric alignment layer containing UV sensitive functional group such as cinnamate group.

Figure 5B:
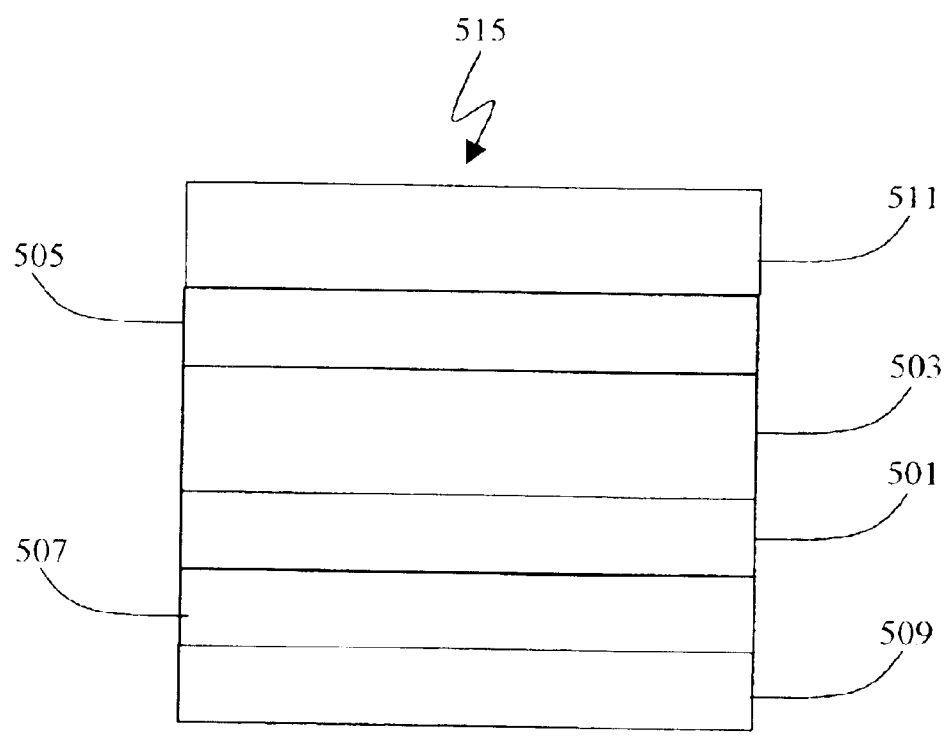
Figure 5C:
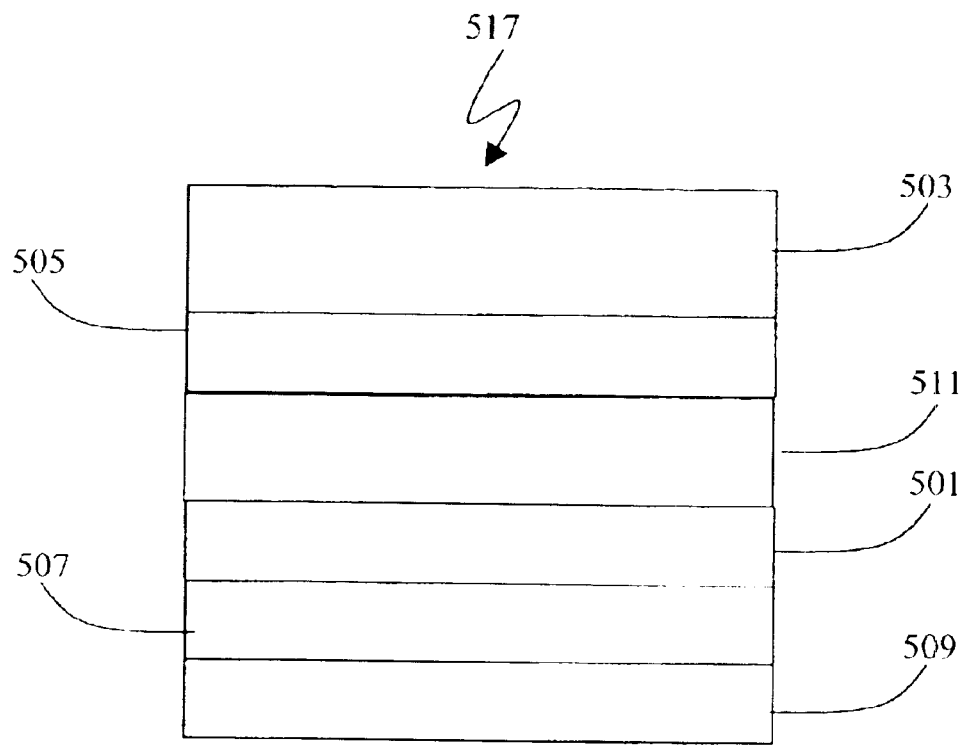

FIG. 5B shows the alternate configuration of the compensation film 515. The optically anisotropic layers, 501, 503 are sandwiched between the two substrates 509, 511 that may or may not be identical to each other. Alignment layers are 505 and 507. This case potentially arises when the compensation films are manufactured by laminating two separate optically anisotropic layers disposed on two separate substrates. The laminating interface is located between the two anisotropic layers, 501 and 503. Other possible lamination case for a compensation film 517 is shown in FIG. 5C. Where the laminating interface is now located between the optically anisotropic layer 501 and the substrate 511. The sum of the retardations of the two substrates ($R_{sub1}$ for 509 and $R_{sub2}$ for 511) $R_{sub1}+R_{sub2}=R_{sub}$ is, preferably, in the range between −200 nm to −60 nm. It is also possible to laminate two films on the substrate sides, that is, lamination interface is located between the two-substrate sides.

Figure 5D:
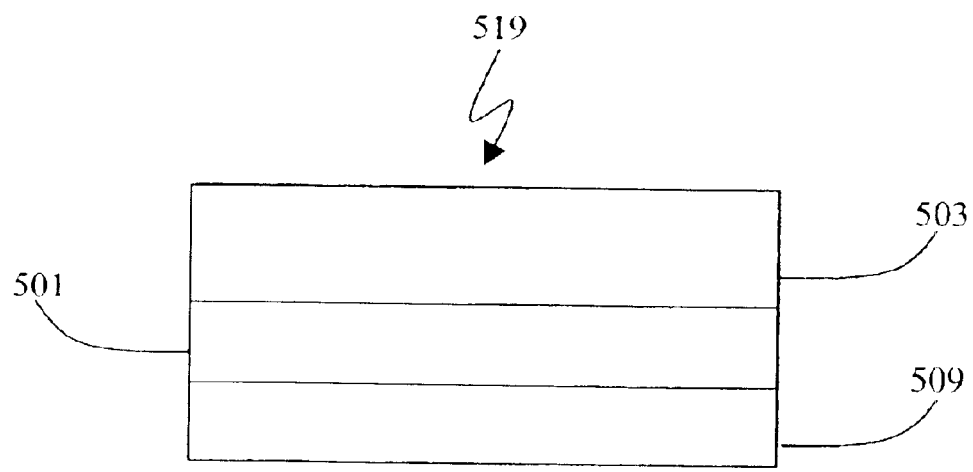

As shown in FIG. 5D, the compensation film 519 without alignment layers 505, 507 is also possible. The optic axis direction in optically anisotropic layers 501, 503 is controlled by an external force such as electric, magnetic field or shear flow forces. Then the optic axis direction is frozen by, for example, polymerization or quenching of the optically anisotropic layers while the external field is being applied. Also, as is well known in the art, layers of inorganic compounds deposited by certain methods and with conditions, give desired direction of optic axes as well as the retardation.

Figure 6A:
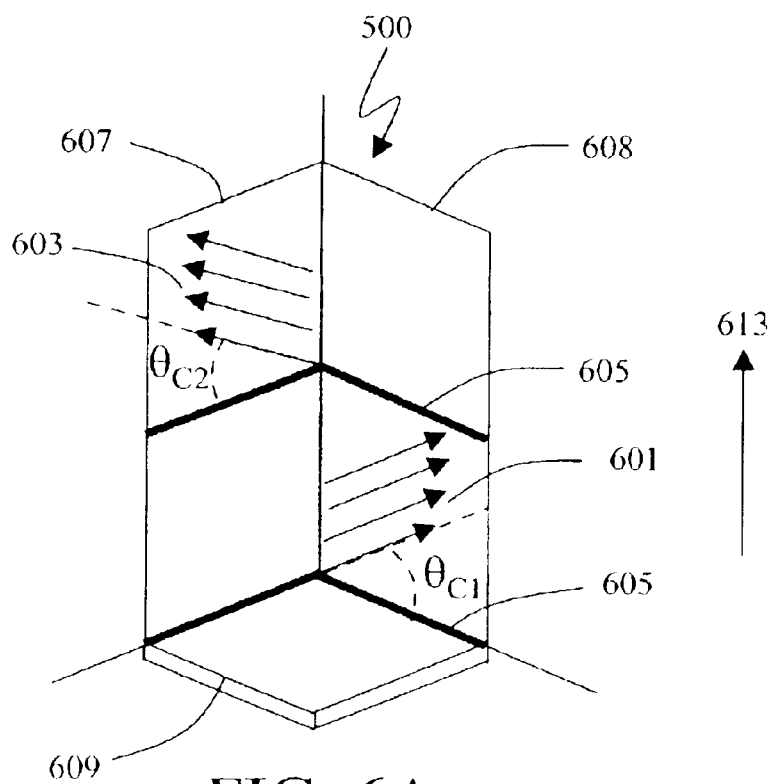
FIG. 6A, FIG. 6B and FIG. 6C are diagrams showing the structure of the compensation film.
Figure 6B:
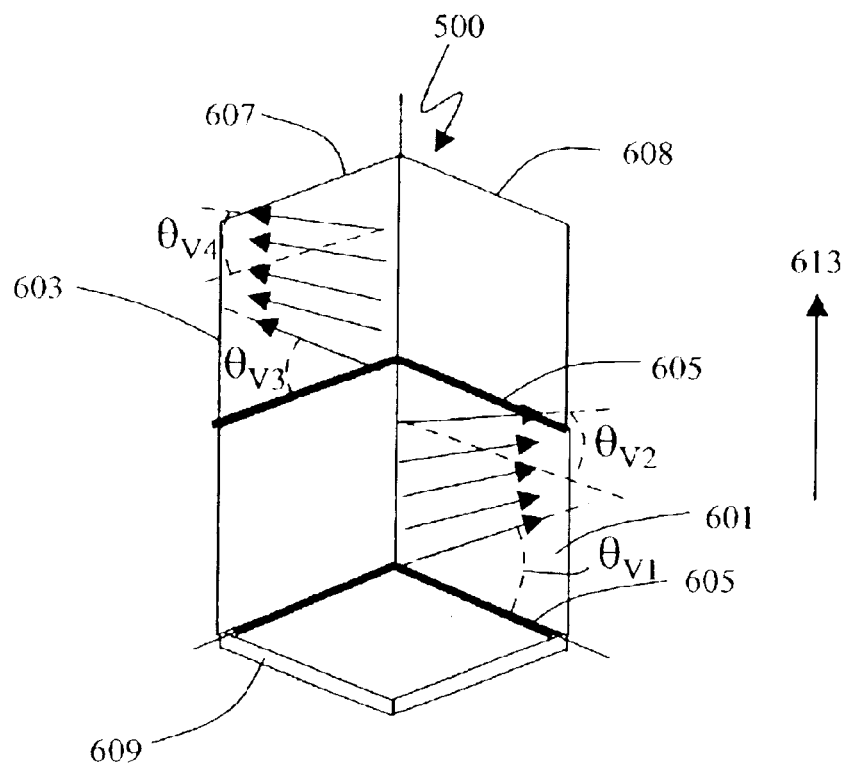
Figure 6C:
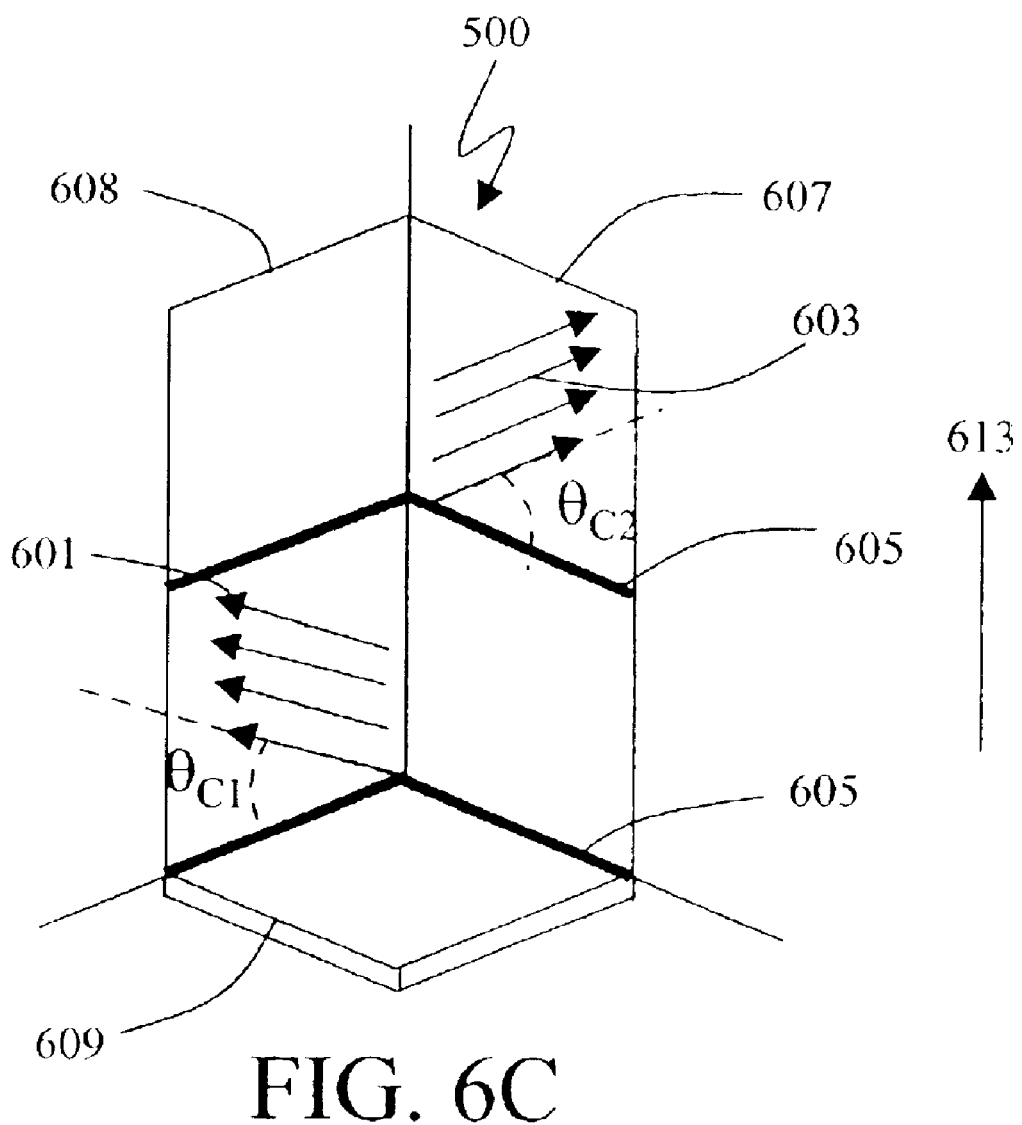

An optically anisotropic layer is characterized by the indices of refraction, retardation (or equivalently thickness) and the direction of optic axis. The direction of optic axis is specified by its tilt θ and azimuthal angles φ. FIG. 6A, FIG. 6B and FIG. 6C show the structure of the film 500 schematically. The optic axis of the first optically anisotropic layer 601 is tilted in a first plane 608, and the optic axis of the second optically anisotropic layer 603 is tilted in a second plane 607. Both first plane 608 and second plane 607 are perpendicular to the film plane or substrate 609. The angle formed between the first plane 608 and the second plane 607 is 90±10°. When the compensation films are placed between the polarizing elements and the liquid crystal cell, the first plane preferably contains the optic axis of liquid crystal on the nearest cell surface to the compensation films. Two optically anisotropic layers 601, 603 are deposited on the alignment layers 605. The substrate 609 supports the whole structure as well as giving necessary optical property for the compensation films. Arrows indicate the direction of optic axis in the optically anisotropic layers. The optic axis in the optically anisotropic layer tilts in the plane perpendicular to the liquid crystal cell plane and the plane of the substrate 609. The tilt angle θ may stay constant as $\theta_{C1}$ and $\theta_{C2}$ (FIG. 6A and FIG. 6C) or vary in the thickness direction of the optically anisotropic layer from $\theta_{V1}$ to $\theta_{V2}$ or $\theta_{V3}$ to $\theta_{V4}$ (FIG. 6B). In the varying case, the average tilt angle $$\theta_{av} = \frac{\int_0^d \theta(z)dz}{d}$$

is used instead of entire tilt profile θ(z) to specify the tilt angle within the optically anisotropic layers. One obtains comparable optical properties from an optically anisotropic layer with a constant tilt $\theta_C$ and an optically anisotropic layer with varying tilt having $\theta_{av}=\theta_C$.

Although a compensation film having similar structure as shown in FIGS. 5A through 6C are well known, the compensation film 500 of the present invention possesses combination of retardation values and different tilt angle of optic axis between the two optically anisotropic layers that are given in a particular range given below. The combination in the given range of tilt and the retardation provide much improved viewing angle performance of O-mode NW-TN-LCD. In the constant tilt angle case as shown in FIG. 6A and FIG. 6C, the tilt angle $\theta_{C1}$ of the first optically anisotropic layer 601 is preferably in the range $10°\leq\theta_{C1}\leq60°$ or more preferably $15°\leq\theta_{C1}\leq50°$. On the other hand, the tilt angle $\theta_{C2}$ for the second anisotropic layer 603 is preferably $0°\leq\theta_{C2}\leq0°$ or more preferably $0°\leq\theta_{C2}\leq20°$. In case of varying tilt angle as shown in FIG. 6B, the average of the tilt angle $\theta_{av1}$ for the first layer 601 are preferably in the range $10°\leq\theta_{av1}\leq60°$, or more preferably $15°\leq\theta_{av1}\leq50°$. For the second optically anisotropic layer 603, the average tilt angle $\theta_{av2}$ is given $0°\leq\theta_{av2}\leq30°$ or more preferably $0°\leq\theta_{av2}\leq20°$. The tilt angles $\theta_{C1}$ and $\theta_{C2}$ (or equivalently $\theta_{av1}$ and $\theta_{av2}$) assume different values. Preferably, the difference between the two angles, $\theta_{C1}-\theta_{C2}$ (or equivalently, $\theta_{av1}-\theta_{av2}$) is larger than 10° but not more than 60°. Various combinations, such as varying tilt in the first optically anisotropic layer 601 and constant tilt in the second one 603 can equally function as a compensation film. The films shown in the FIGS. 6A and 6B are left-handed, meaning that the optic axis 601 rotates counter-clockwise to optic axis 603 as one follows the direction of increasing thickness indicated by an arrow 613. If it rotates counter-clockwise in the thickness direction as shown in FIG. 6C, it is called right handed twist. The optic axis 601 rotates counter clockwise to 603 in the direction of increasing thickness indicated by an arrow 613. The handed ness of the compensation film and that of liquid crystal cell is preferably the same.

The retardation of the first optically anisotropic layer $R_1$ is defined as $(ne_1-no_1)d_1$, where $d_1$ is the thickness of the first optically anisotropic layer. The retardation of the second optically anisotropic layer $R_2$ is equally defined as $(ne_2-no_2)d_2$. The value of $R_1$ is in the range 60 nm$\leq R_1\leq$220 nm and $R_2$ is in the range 85 nm$\leq R_2\leq$210 nm. For a given $R_{sub}$, the preferable values for the retardation, $R_1$ and $R_2$ for the first 601 and the second 603 optically anisotropic layers depend on each other and also on the combination of angles $\theta_{C1}$ and $\theta_{C2}$ (or equivalently, $\theta_{av1}$ and $\theta_{av2}$) between the two layers, 601 and 603. FIG. 7A, FIG. 7B, FIG. 7C, FIG. 7D, FIG. 7E and FIG. 7F show the range of the preferable values for $R_1$ and $R_2$ for a given combination of tilt angles and $R_{sub}$ as tabulated in the Table 1.

TABLE 1

The values of tilt angles and $R_{sub}$ corresponding to FIGS. 7A through 7E.

Figure 7A:
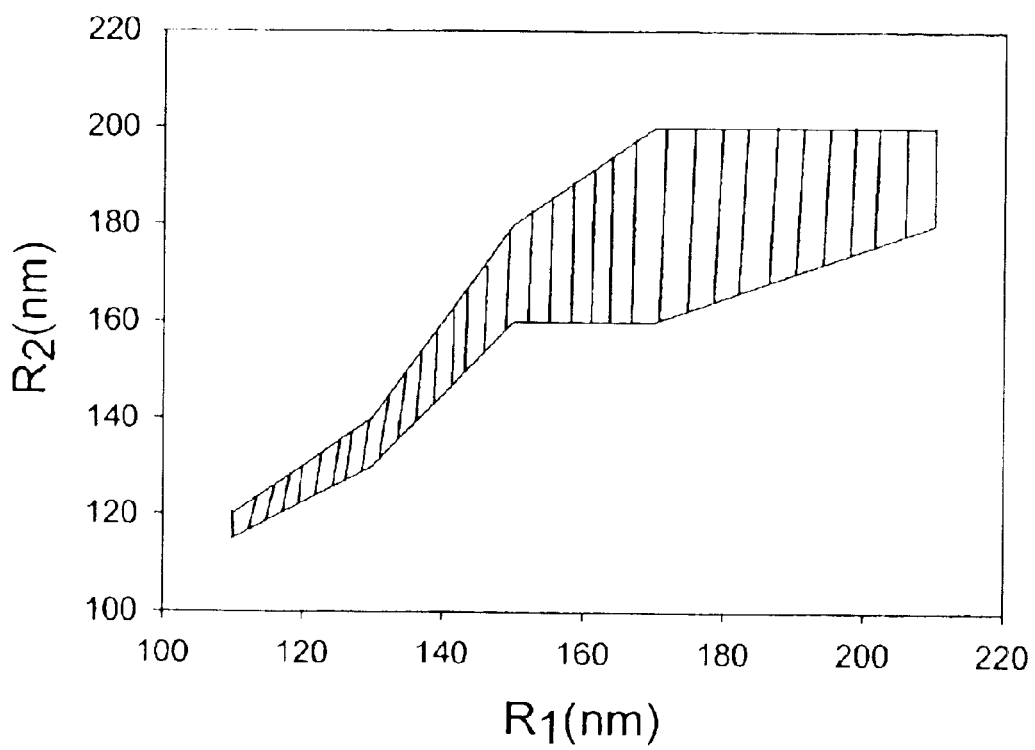
FIGS. 7A through 7F are graphs showing the range of retardations $R_1$ and $R_2$ for different combination of the tilt angles $\theta_{C1}$ and $\theta_{C2}$ (or equivalently $\theta_{av1}$ and $\theta_{av2}$) and $R_{sub}$. The compensation films having $R_1$ and $R_2$ within the shaded area allow a contrast ratio 10 line extending to polar viewing angle α=60° or higher at azimuthal viewing angles β=0°, 90°, 180° and 270°.
Figure 7B:
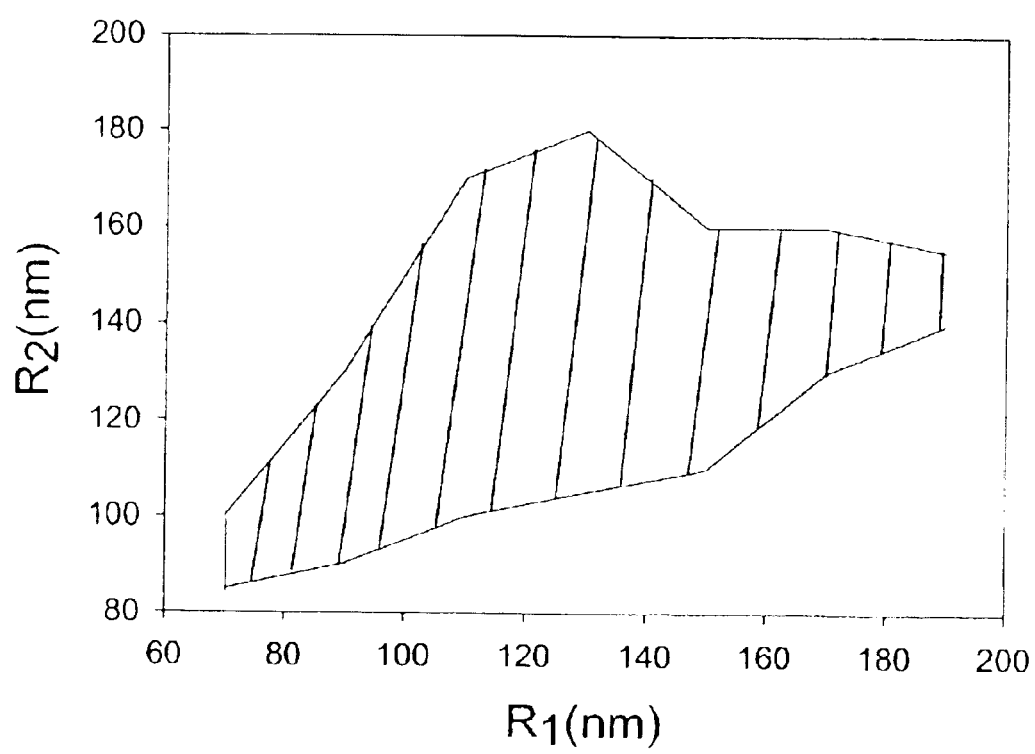
Figure 7C:
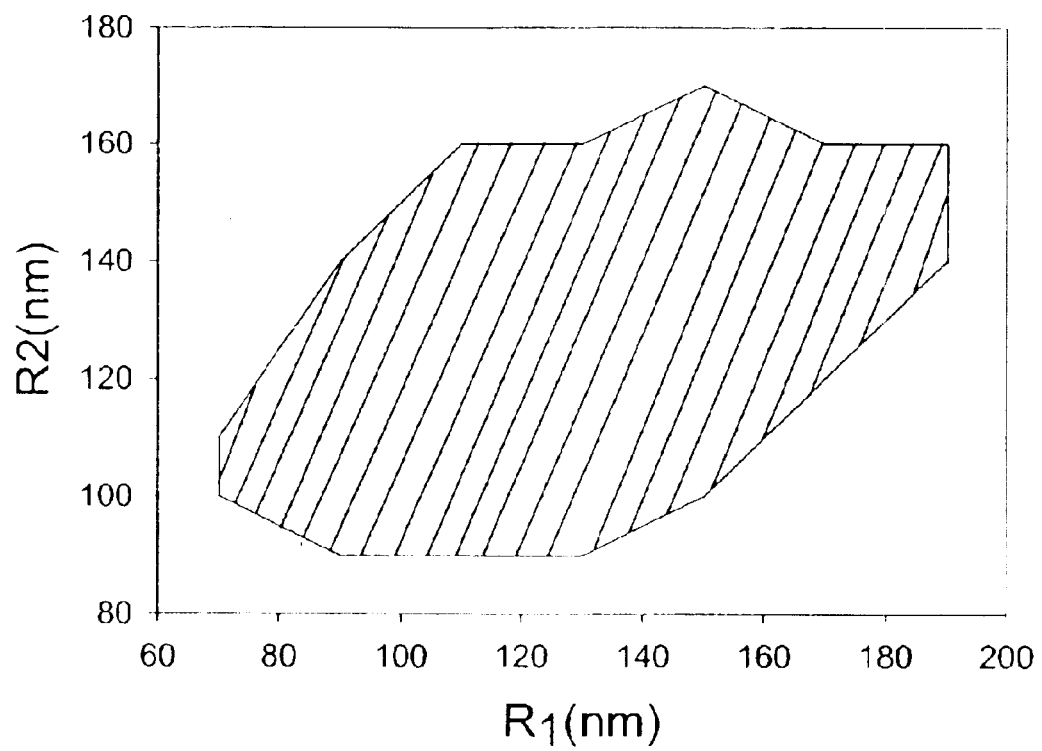
Figure 7D:
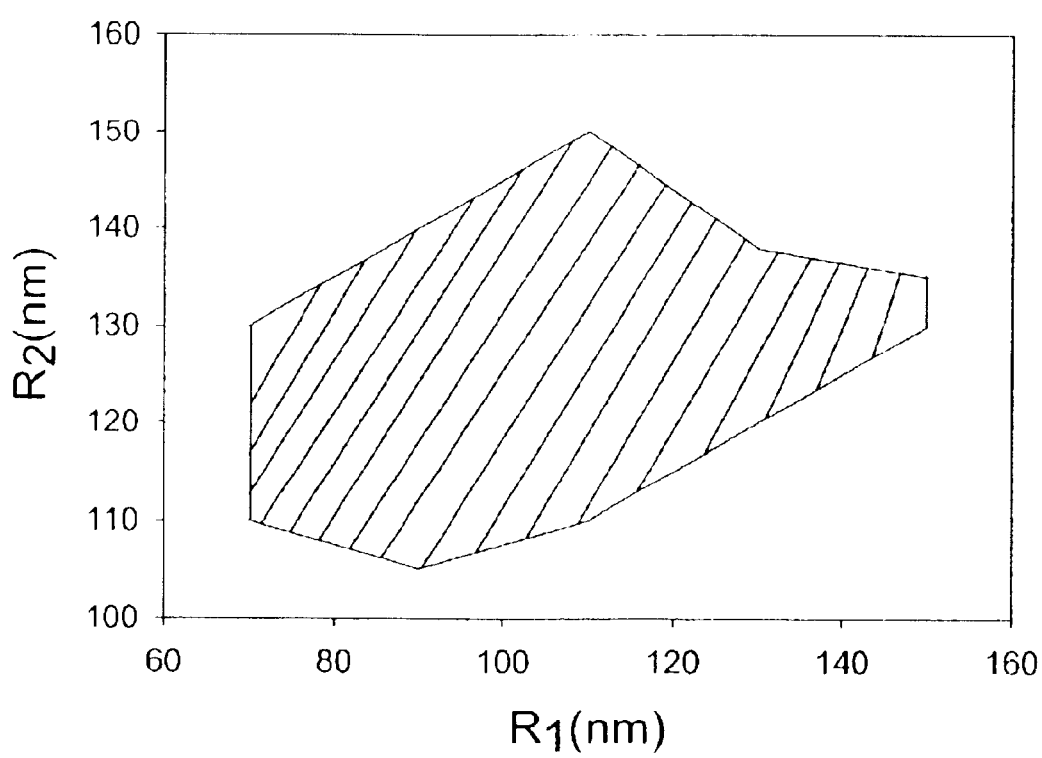
Figure 7E:
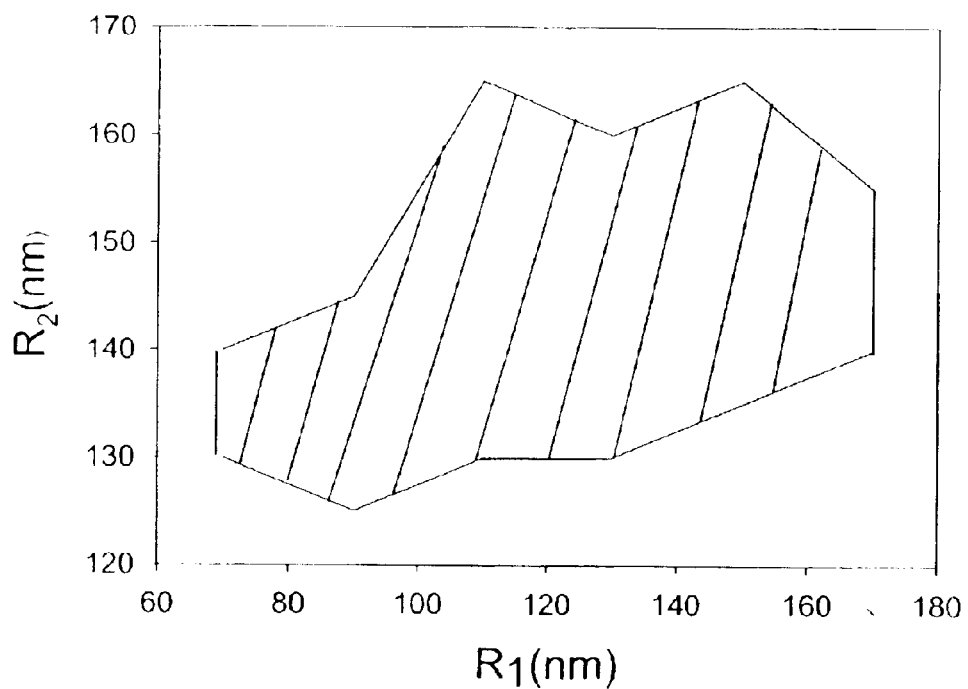
Figure 7F:
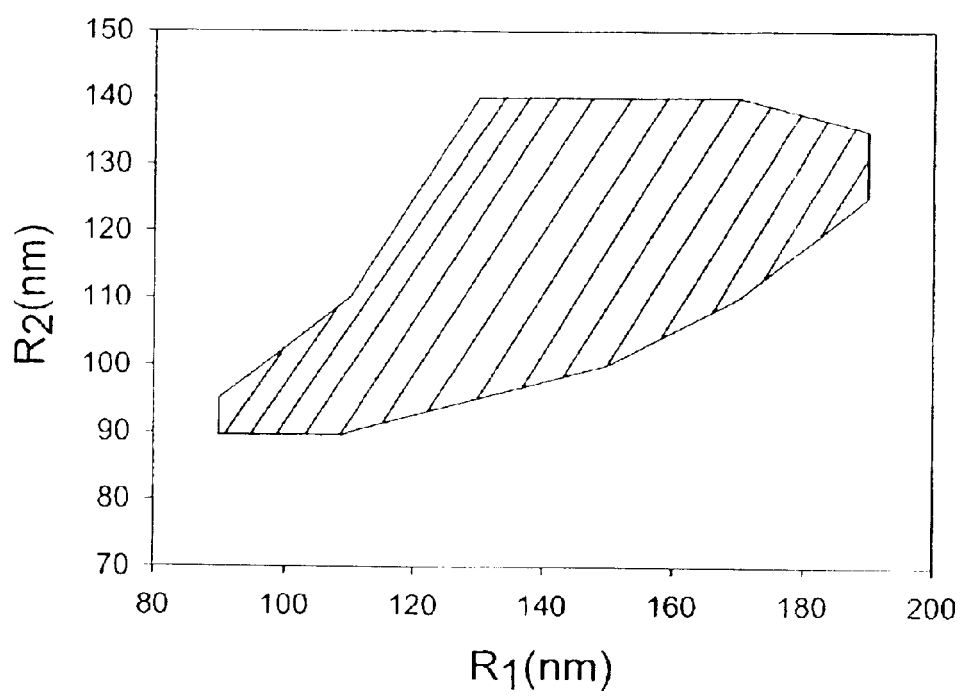

|  | $\theta_{C1}$ (or $\theta_{av1}$) | $\theta_{C2}$ (or $\theta_{av2}$) | $R_{sub}$ (nm) |
|---|---|---|---|
| FIG. 7A | 15° | 0° | −120 |
| FIG. 7B | 25° | 0° | −120 |
| FIG. 7C | 40° | 0° | −120 |
| FIG. 7D | 40° | 10° | −120 |
| FIG. 7E | 45° | 15° | −140 |
| FIG. 7F | 40° | 0° | −160 |

The compensation films having $R_1$ and $R_2$ within the shaded area allow a contrast ratio 10 line extending to polar viewing angle α=60° or higher at azimuthal viewing angles β=0°, 90°, 180° and 270°, simultaneously.

Figure 8A:
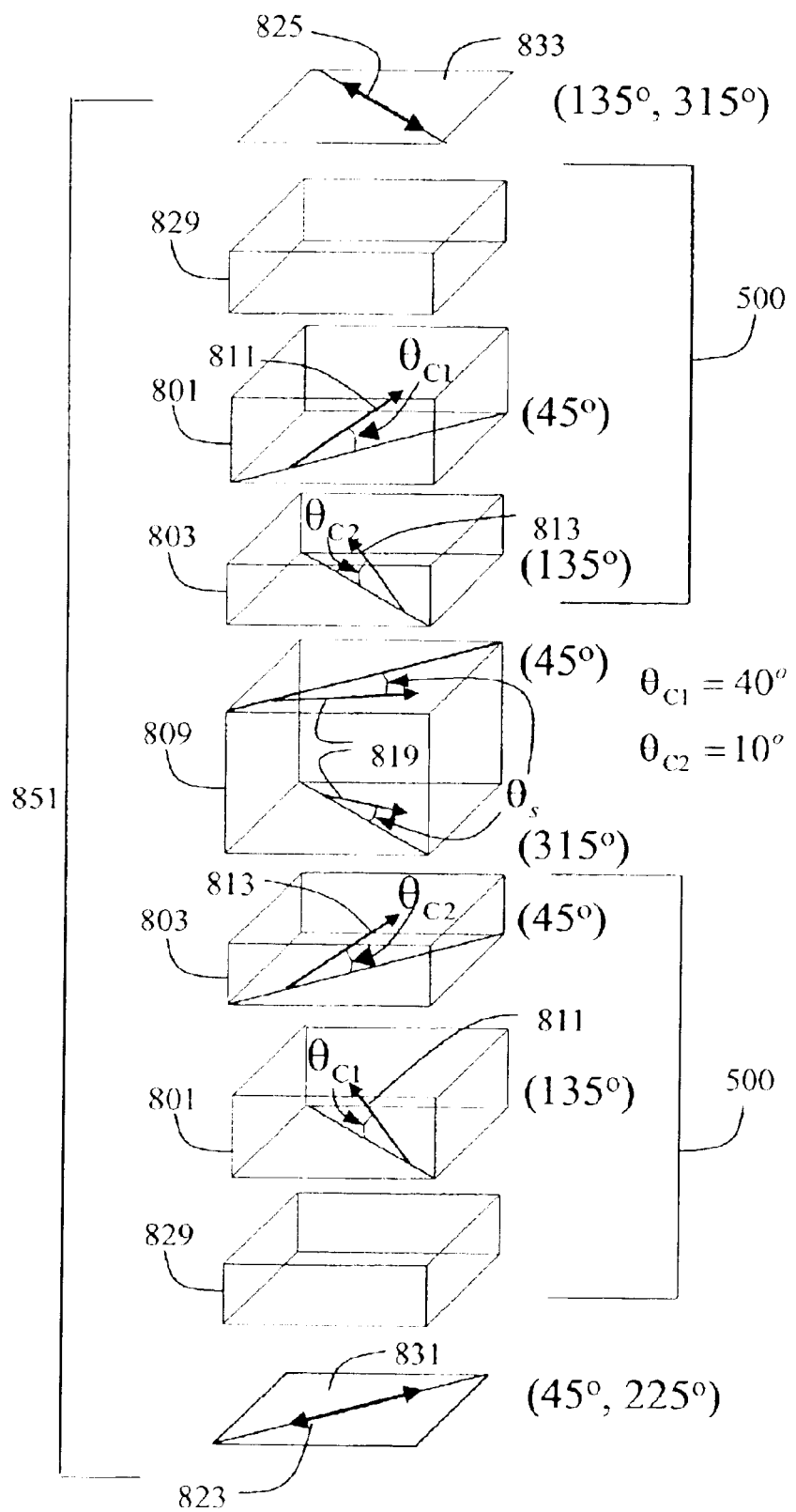
FIG. 8A is an O-mode NW-TN-LCD with compensation film having parameters $\theta_{C1}=40°$, $\theta_{C2}=10°$ (or equivalently $\theta_{av1}=40°$, $\theta_{av1}=10°$), $R_1=140$ nm, $R_2=120$ nm and $R_{sub}=-120$ nm according to the invention.

FIG. 8A is the schematic of the O-mode NW-TN-LCD 851 with the compensation film 500 according to the invention. The optically anisotropic layers 801 and 803 (corresponding to layers 601, 603, respectively, in FIGS. 6A and 6B) are shown separately disposed on the substrate 829. The alignment layers are not shown in FIG. 8A. The TN liquid crystal cell 809 is placed between two pairs of optically anisotropic layers 803. Arrows 819 indicate the direction of liquid crystal optic axis at the cell surfaces. The direction of optic axis in optically anisotropic layers 801 and 803 is shown by the arrows 811 and 813, respectively. In the figure, the tilt angles of optic axis in the first 801 and the second 803 optically anisotropic layers are shown as a constant, $\theta_{C1}$=40° and $\theta_{C2}$=10°. However, as mentioned above, they can be replaced by anisotropic layers with varying tilt having $\theta_{av1}=\theta_{C1}$=40° and $\theta_{av2}=\theta_{C2}$=10°. The retardations are $R_1$=140 nm for layer 801 and $R_2$=120 nm for layer 803. The substrate 829 is a negative C-plate with the retardation $(n e_s-n o_s)d_s$=−120 nm. The double-headed arrows 823, 825 show the transmission axes of polarizer 831 and analyzer 833, which have azimuthal angle φ of 45° (or 225°) and 135° (or 315°), respectively. The azimuthal angle between the transmission axis of polarizing elements and optic axis of liquid crystal on the nearest cell surface to the polarizing elements is 90°. Thus the display 851 is O-mode NW-TN-LCD. Azimuthal angles of optic axes and the transmission axes are given in the parenthesis. The optic axis 811 of the first anisotropic layer 801 tilts in the plane that contains the optic axis of liquid crystal on the nearest cell surface. Alternatively, one can use the compensation film 515 with the structure such as in FIG. 5B. The corresponding display 855 is shown in FIG. 8C. In this display, tilt angles are such that $\theta_{av1}=\theta_{C1}$=40° and $\theta_{av2}=\theta_{C2}$=0° and the phase retardation value $R_1$ for layer 801 is 140 nm and that of 803 $R_2$ is set at 120 nm. There are additional substrate layers 853 between the second anisotropic layer 803 and the liquid crystal cell 809. The retardation of the substrates 829 and 853 are $R_{sub1}$=−60 nm and $R_{sub2}$=−60 nm, respectively thus $R_{sub}$=−120 nm.

Figure 8B:
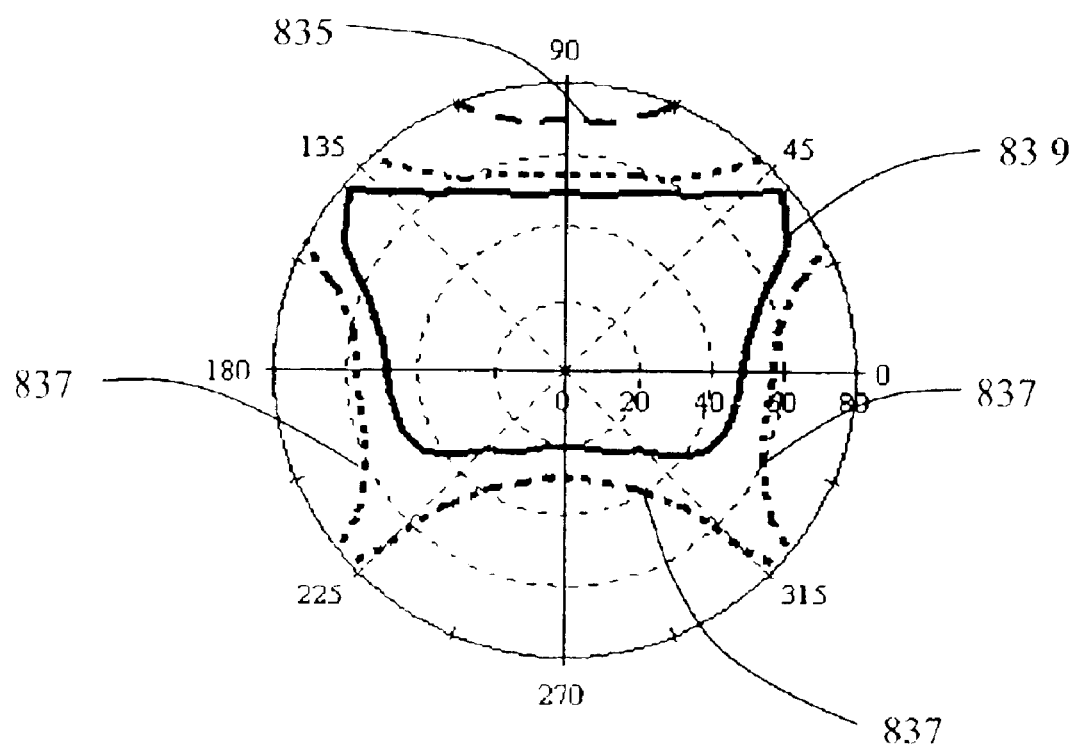
FIG. 8B is an isocontrast plot of the O-mode NW-TN-LCD shown in FIG. 8A.
Figure 8C:
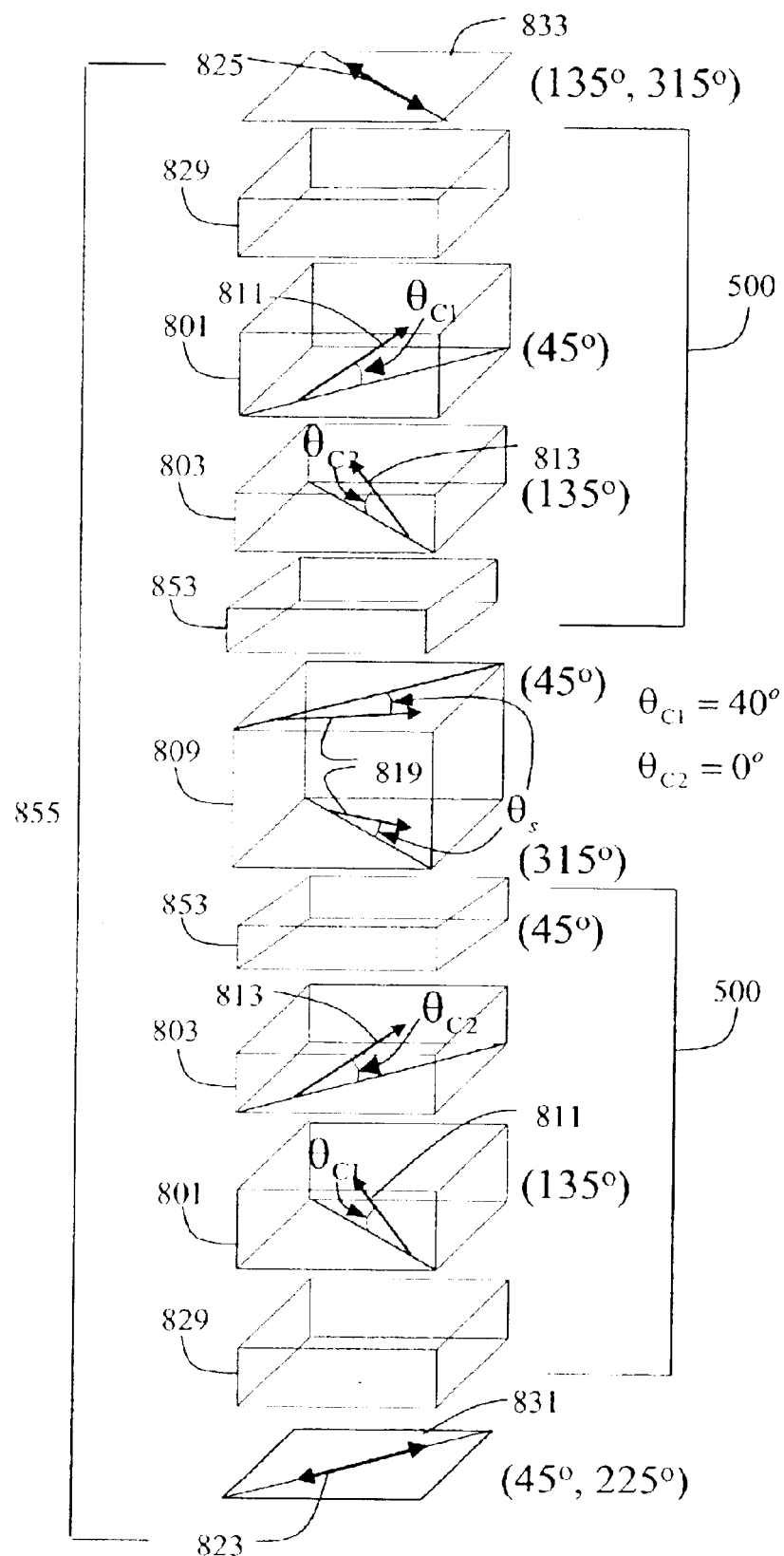
FIG. 8C is an O-mode NW-TN-LCD with compensation film having parameters $\theta_{C1}=40°$, $\theta_{C2}=0°$ (or equivalently $\theta_{av1}=40°$, $\theta_{av1}=0°$), $R_1=140$ nm, $R_2=120$ nm. Two substrates have different retardation $R_{sub1}=-60$ nm and $R_{sub2}=-60$ nm.
Figure 8D:
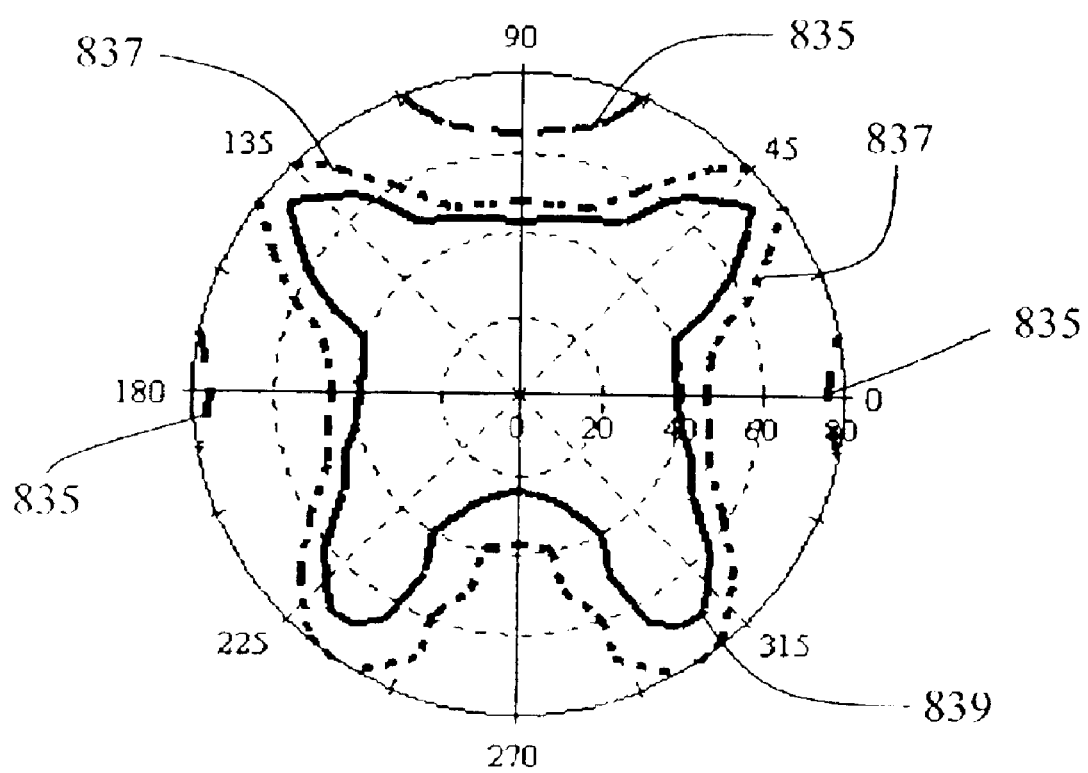
FIG. 8D is an isocontrast plot of the O-mode NW-TN-LCD shown in FIG. 8C.

FIG. 8B and FIG. 8D are isocontrast plots for the display 851 and 855 shown in FIG. 8A and FIG. 8C, respectively. The lines 835, 837 and 839 are isocontrast lines with contrast ratio 10, 50 and 100, respectively.

Figure 1:
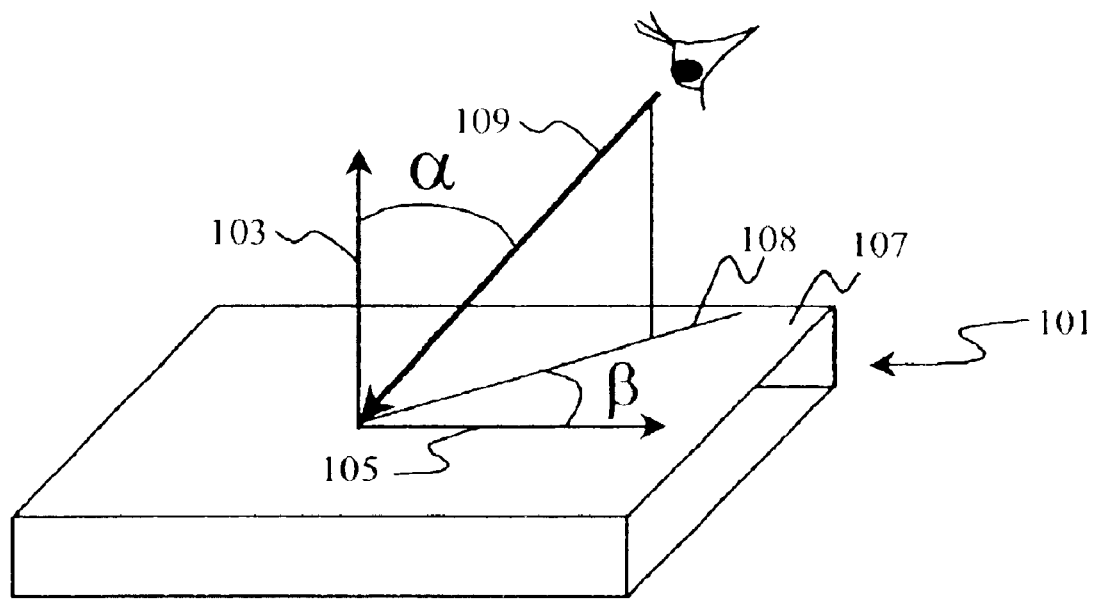
FIG. 1 shows the definition of a viewing angle direction.
Figure 2:
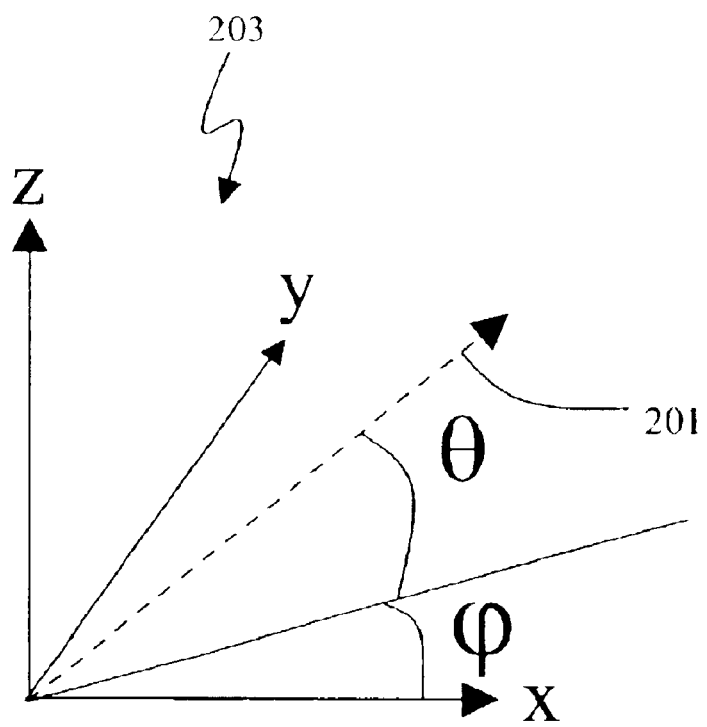
FIG. 2 shows the definition of the tilt and azimuthal angles to specify a direction of an optic axis.
Figure 3A:
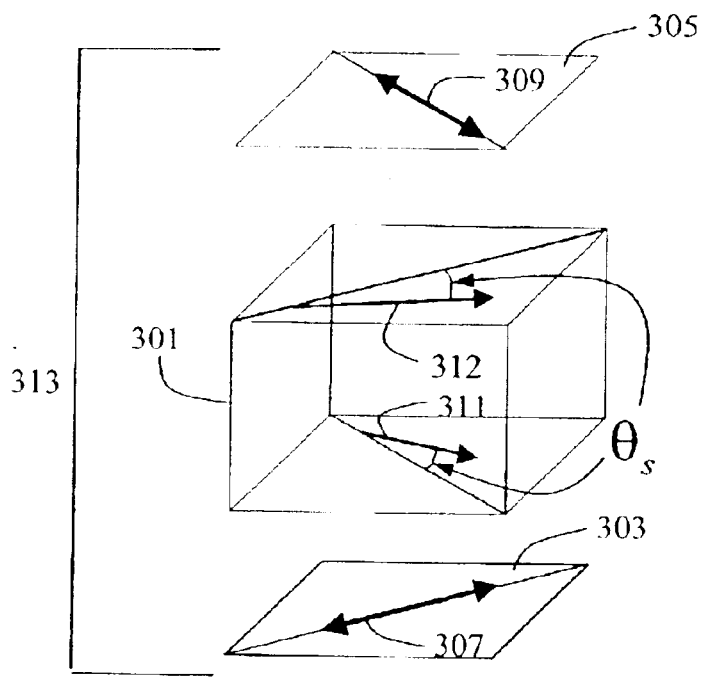
FIG. 3A is a prior art O-mode NW-TN-LCD without a compensation film.
Figure 3B:
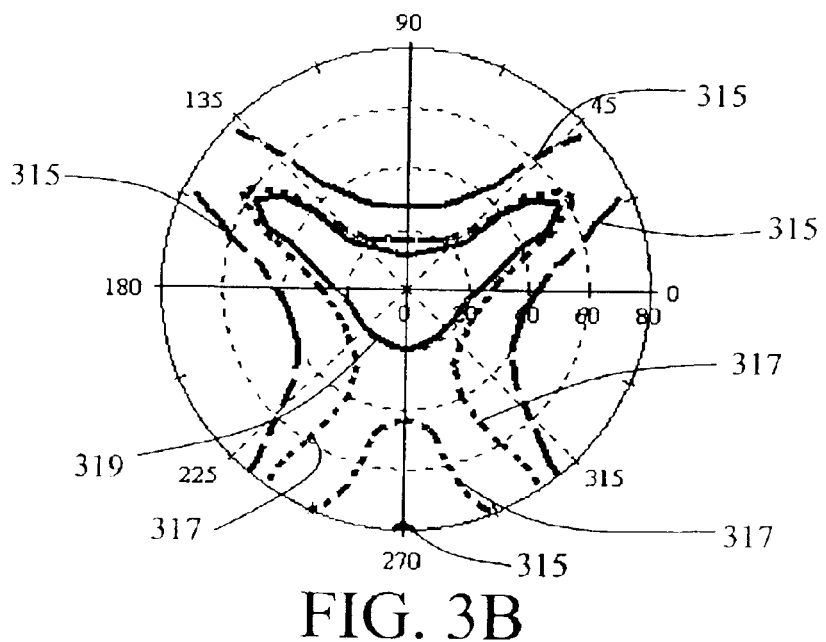
FIG. 3B is an isocontrast plot of the prior art O-mode NW-TN-LCD shown in FIG. 3A.
Figure 4A:
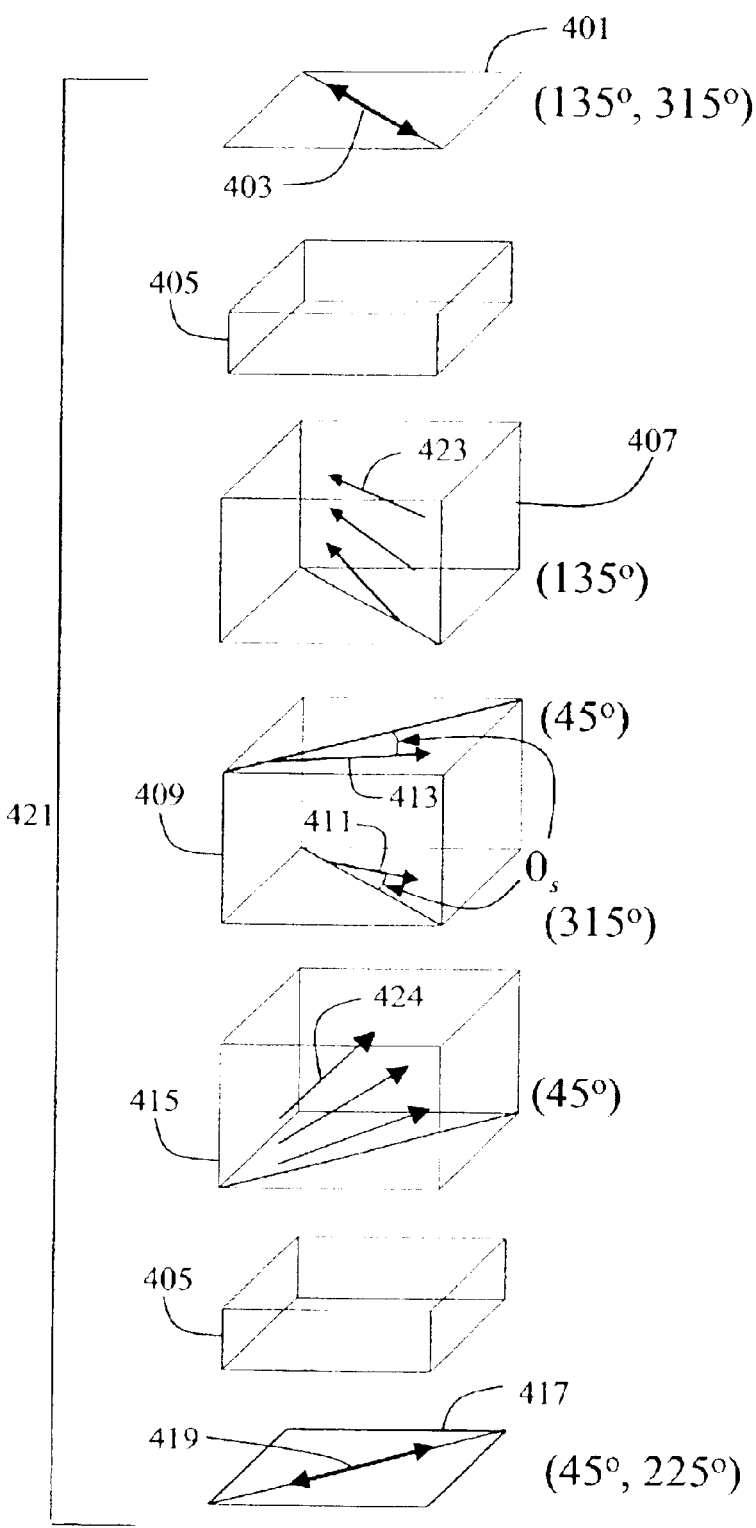
FIG. 4A is a prior art O-mode NW-TN-LCD with hybrid-aligned compensation films having 40° average tilt and thickness 0.42 μm and phase retardation of 100 nm. The substrate has a retardation of $R_{sub}=-60$ nm.
Figure 4B:
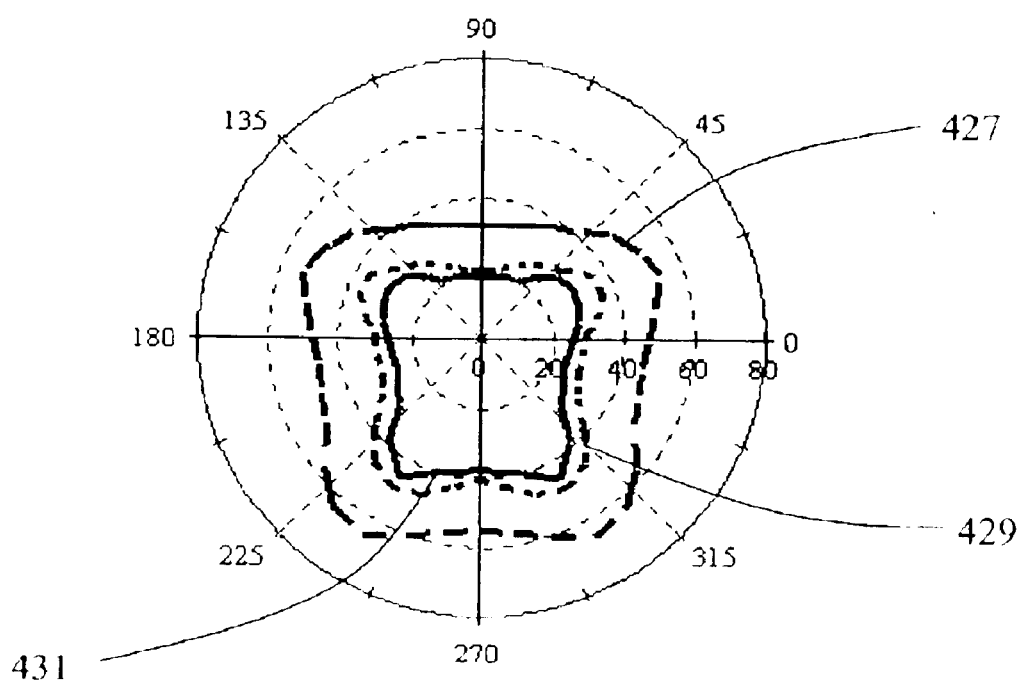
FIG. 4B is an isocontrast plot of the prior art O-mode NW-TN-LCD shown in FIG. 4A.

For a comparison, FIG. 4B shows the isocontrast plot of the display 421 (shown in FIG. 4A) with a prior art compensation film in which the optically anisotropic layers with hybrid alignment 407, 415 having average tilt angle θ=40°, thickness of 0.42 μm and the phase retardation value 100 nm with a substrate having $R_{sub}$=−60 nm. The lines 427, 429, 431 are isocontrast lines for contrast ratio 10, 50 and 100, respectively.

It can be seen both in FIG. 8B and FIG. 8D that the area enclosed by the isocontrast line 10, 835, is much larger than their counter part by the line 427 in the isocontrast plot shown in FIG. 4B. The display 851 has a contrast ratio higher than 50 in wide viewing angle range. The display 855 has achieved much wider viewing angle range with contrast ratio 10 or higher in comparison to the prior art display 421. On the other hand, the prior art display 421 has significant viewing angle portion with contrast less than 10 that is located outside of the isocontrast line 10 in the isocontrast plot shown in FIG. 4B.

Table 2 shows average viewing angle (average value of polar viewing angle α at β=0°, 90°, 180°, 270°) that corresponds to the particular contrast ratios (50, 100 and 200) for the prior art display 421 in FIG. 4A (Prior Art Display), and the display 851 in FIG. 8A. A display with a better viewing angle characteristic has a larger average viewing angle of α at the same contrast ratio. It is demonstrated that display 851 of the invention has significantly wider viewing angle range for the same contrast ratio in comparison to the Prior Art Display 421. For example, average viewing angle range with contrast 100 or higher is expanded to 41° from 23°.

TABLE 2

Comparison of average viewing angle between the prior art compensation film and the one according to the current invention.

| Iso-Contrast | Average Viewing Angle Prior Art film | Average Viewing Angle Current Invention Film |
|---|---|---|
| 50 | 29° | 49° |
| 100 | 23° | 41° |
| 200 | 20° | 35° |

FIG. 7A, FIG. 7B, FIG. 7C, FIG. 7D, FIG. 7E and FIG. 7F clearly show that the retardations, $R_1$ and $R_2$, and tilt angles of the first and the second optically anisotropic layers as well as the substrate retardation $R_{sub}$ need to be optimized simultaneously. For fixed value of $R_{sub}$, the retardations $R_1$ and $R_2$ depend on each other, and their range differs for a different tilt angle combination. According to FIG. 7C, for example, at $R_{sub}$=−120 nm, if the average tilt of the first layer is 40° and that of the second is 0° and $R_1$ is 120 nm, then we have preferable value for $R_2$ given by 90 nm≦$R_2$≦160 nm. If the angles $\theta_{C1}$ and $\theta_{C2}$ (or equivalently, $\theta_{av1}$ and $\theta_{av2}$) are respectively 40° and 10°, and $R_1$=120 nm, we have preferable range 115 nm≦$R_2$≦145 nm as indicated by FIG. 7D. Comparison of FIGS. 7C and 7F gives the $R_{sub}$ dependence of optimum values for $R_1$ and $R_2$ for the same tilt angles. The necessity of the simultaneous optimization is clearly demonstrated in the contrast plots FIGS. 9A through 9D. They are isocontrast plots of O-mode NW-TN-LCD such as shown in FIG. 4A or FIG. 8A but with different parameter for tilt angles $\theta_{C1}$ and $\theta_{C2}$ (or equivalently $\theta_{av1}$ and $\theta_{av2}$), and retardations $R_1$ and $R_2$, and $R_{sub}$ as given in Table 3. In FIGS. 9A through 9D, the lines 901, 903 and 905 correspond to isocontrast line with contrast ratio 10, 50 and 100, respectively.

TABLE 3

Values of tilt angles and retardation of the
optically anisotropic layers corresponding
to the isocontrast plots FIGS. 9A through 9D.

Figure 9A:
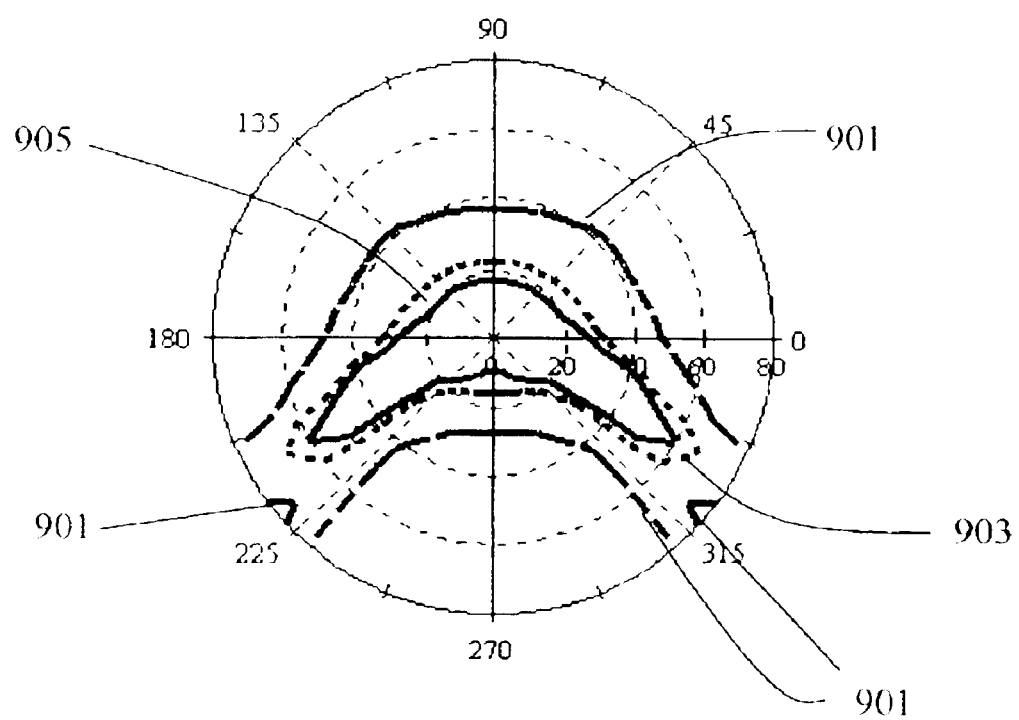
FIG. 9A is an isocontrast plot of the O-mode NW-TN-LCD with compensation film with $\theta_{C1}=40°$, $\theta_{C2}=40°$ (or equivalently $\theta_{av1}=40°$, $\theta_{av2}=40°$), $R_1=140$ nm, $R_2=140$ nm and $R_{sub}=-120$ nm.
Figure 9B:
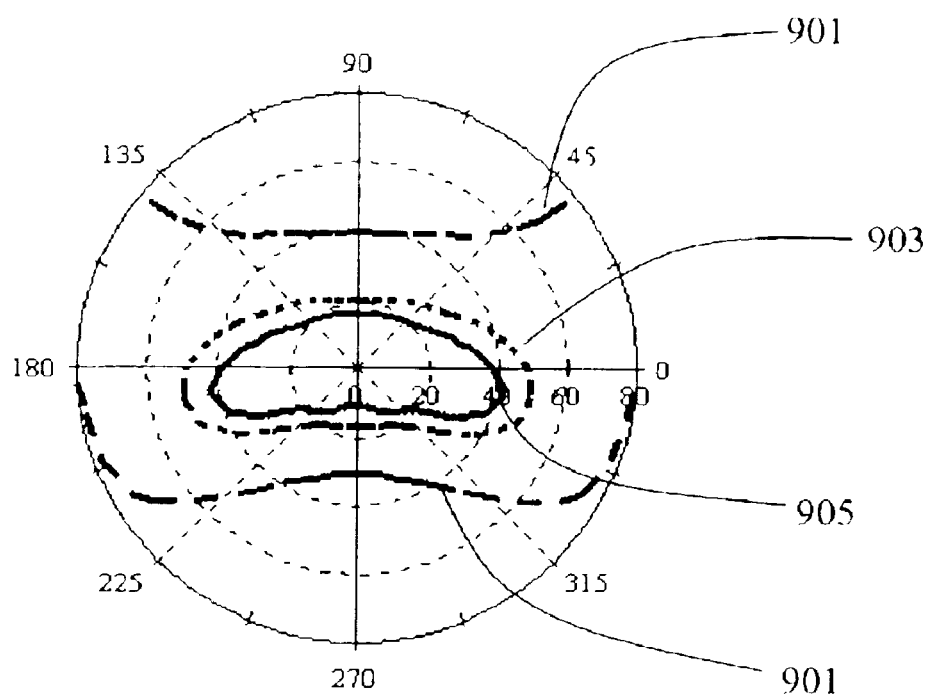
FIG. 9B is an isocontrast plot of the O-mode NW-TN-LCD with compensation film with $\theta_{C1}=0°$, $\theta_{C2}=0°$ (or equivalently $\theta_{av1}=0°$, $\theta_{av2}=0°$), $R_1=120$ nm, $R_2=120$ nm and $R_{sub}=-120$ nm.
Figure 9C:
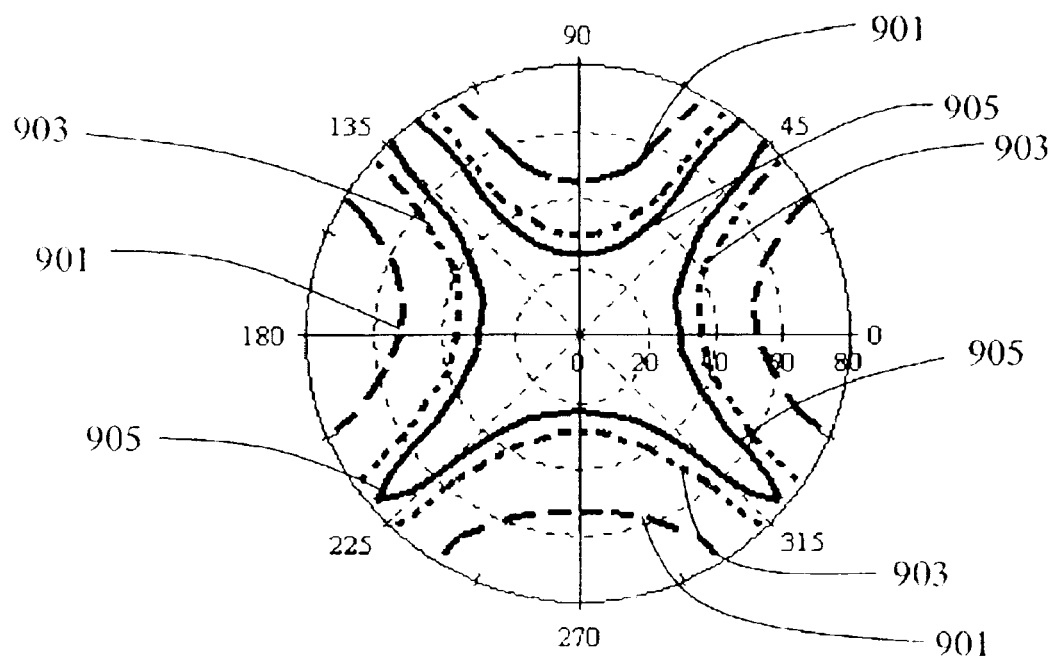
FIG. 9C is an isocontrast plot of the O-mode NW-TN-LCD with compensation film with $\theta_{C1}=40°$, $\theta_{C2}=10°$ (or equivalently $\theta_{av1}=40°$, $\theta_{av2}=10°$), $R_1=140$ nm, $R_2=120$ nm and $R_{sub}=-200$ nm.
Figure 9D:
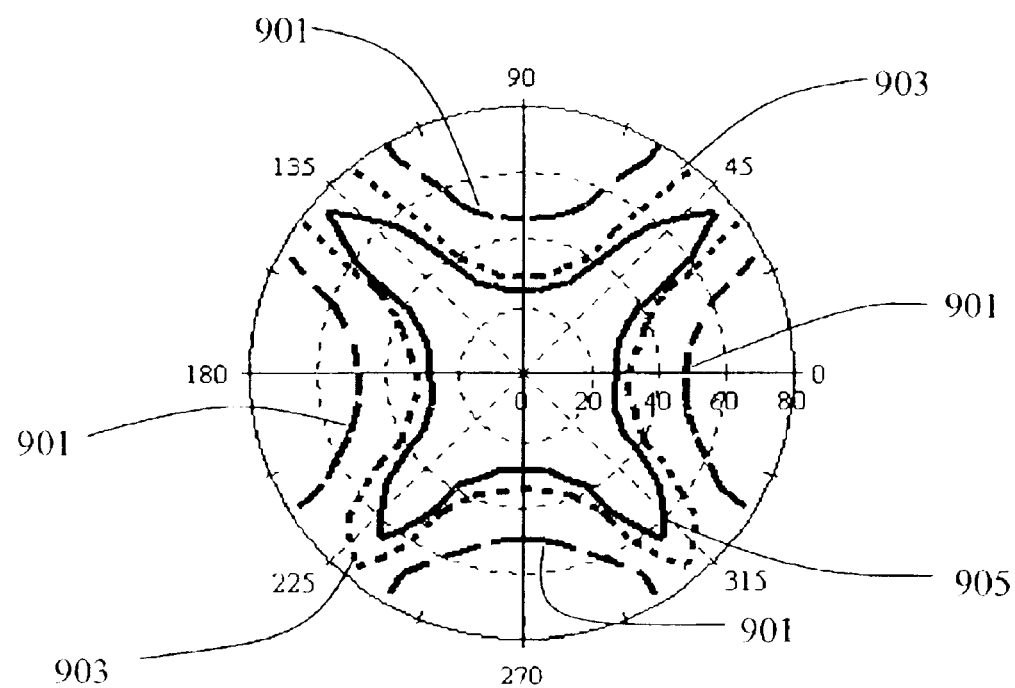
FIG. 9D is an isocontrast plot of the O-mode NW-TN-LCD with compensation film with $\theta_{C1}=50°$, $\theta_{C2}=5°$ (or equivalently $\theta_{av1}=50°$, $\theta_{av2}=5°$), $R_1=100$ nm, $R_2=40$ nm and $R_{sub}=-160$ nm.

| | $\theta_{C1}$ or $\theta_{av1}$ | $\theta_{C2}$ or $\theta_{av2}$ | $R_1$ (nm) | $R_2$ (nm) | $R_{sub}$ (nm) |
|---|---|---|---|---|---|
| FIG. 9A | 40° | 40° | 140 | 140 | −120 |
| FIG. 9B | 0° | 0° | 120 | 120 | −120 |
| FIG. 9C | 40 | 10° | 140 | 120 | −200 |
| FIG. 9D | 50° | 5° | 100 | 40 | −160 |

FIG. 9A and FIG. 9B show that simultaneous change in the tilt angles $\theta_{C1}$ and $\theta_{C2}$ (or equivalently, $\theta_{av1}$ and $\theta_{av2}$) does not necessarily give a satisfactory performance in viewing angle characteristic. Neither one of them has an isocontrast 10 line extending α=60° or higher simultaneously at β=0°, 90°, 180° and 270°.

Combination of two tilt angles and the values for $R_1$ and $R_2$ as used in the display 851 in FIG. 8A with larger negative value of $R_{sub}$ shows degradation in display performance in comparison to the display 851 and 855. This is demonstrated by the isocontrast plots shown in FIG. 9C.

FIG. 9D is the isocontrast plot of the O-mode NW-TN-LCD display with compensation film having $\theta_{C1}$ and $\theta_{C1}$ (or equivalently $\theta_{av1}$ and $\theta_{av2}$) and $R_1$, $R_2$ and $R_{sub}$ that are in the range suitable for E-mode NW-TN-LCD disclosed in co-pending U.S. patent application Ser. No. 10/318,773. It is clear that the simple application of a film with parameters tuned for E-mode does not give satisfactory viewing angle characteristic when it is applied to O-mode display. The isocontrast plot in FIG. 9D shows good viewing angle characteristic compared to the Prior Art Display 421 in the diagonal direction (β=45°, 135°, 225°, 315°), however, no significant improvement is achieved in horizontal (β=0°, 180°) and the vertical (β=90°, 270°) directions. The performance is clearly inferior to that of the displays 851 and 855.

EP Application 1143271A2 and WO 97/44409 discusses the combination of different tilt angles between the two O-plates. However, it is a surprising result that particular combinations of two tilt angles $\theta_{C1}$, $\theta_{C2}$ (or equivalently $\theta_{av1}$ and $\theta_{av2}$), the retardations $R_1$, $R_2$, and the retardation of the substrate $R_{sub}$ result in unforeseeable and significant improvements in the viewing angle range.

Additional benefit of the current invention is that it offers wide range of parameters $\theta_{C1}$, $\theta_{C2}$ (or equivalently $\theta_{av1}$ and $\theta_{av2}$), $R_1$, $R_2$ and $R_{sub}$ of the compensation film that has superior performance than the prior art displays, such as the one 421 shown in FIG. 4A. It offers wide tolerance in $R_1$ and $R_2$ for some combinations of tilt angles. As shown in the FIG. 7C, when $\theta_{C1}$=40° and $\theta_{C2}$=0° (or equivalently $\theta_{av1}$=40° and $\theta_{av1}$=0°) the possible range of the $R_1$ and $R_2$ are given by 70 nm≦$R_1$≦190 nm and 90 nm≦$R_2$≦170 nm. This holds also true for the tilt angles $\theta_{C1}$ and $\theta_{C2}$ (or equivalently $\theta_{av1}$ and $\theta_{av2}$) for a given pair of $R_1$, $R_2$ and $R_{sub}$. For example, if $R_1$=120 nm and $R_2$=100 nm with $R_{sub}$=−120 nm, the possible range for tilt angles are 25°≦$\theta_{av1}$≦50° and 0°≦$\theta_{av1}$≦10°. Thus the invention offers excellent manufacturing flexibility.

The entire contents of the patents and other publications referred to in this specification are incorporated herein by reference.

PARTS LIST

| | |
|---|---|
| 101 | liquid crystal display |
| 103 | normal direction of display surface |
| 105 | azimuthal reference direction for azimuthal angle |
| 107 | display surface |
| 108 | projection of viewing direction arrow on the display surface |
| 109 | arrow indicating the viewing direction |
| 201 | direction of optic axis specified by azimuthal angle φ and tilt angle θ |
| 203 | x-y-z coordinate system |
| 301 | liquid crystal cell |
| 303 | polarizer |
| 305 | analyzer |
| 307 | transmission axis of polarizer |
| 309 | transmission axis of analyzer |
| 311 | optic axes of liquid crystal at the liquid crystal cell surfaces |
| 312 | optic axes of liquid crystal at the liquid crystal cell surfaces |
| 313 | prior art O-mode NW-TN-LCD |
| 315 | isocontrast line corresponding to contrast ratio 10 |
| 317 | isocontrast line corresponding to contrast ratio 50 |
| 319 | isocontrast line corresponding to contrast ratio 100 |
| 401 | analyzer |
| 403 | transmission axis of analyzer 401 |
| 405 | negative C-plate representing the substrate |
| 497 | compensation film |
| 409 | liquid crystal cell |
| 411 | optic axis of the liquid crystal at the cell surface |
| 413 | optic axis of the liquid crystal at the cell surface |
| 415 | compensation film |
| 417 | polarizer |
| 419 | transmission axis of polarizer 417 |
| 421 | O-mode NW-TN-LCD |
| 423 | optic axis of the compensation film 407 |
| 424 | optic axis of the compensation film 415 |
| 427 | isocontrast line corresponding to contrast ratio 10 |
| 429 | isocontrast line corresponding to contrast ratio 50 |
| 431 | isocontrast line corresponding to contrast ratio 100 |
| 500 | compensation film |
| 501 | first optically anisotropic layer |
| 503 | second optically anisotropic layer |
| 505 | alignment layer |
| 507 | alignment layer |
| 509 | substrate |
| 511 | substrate |
| 515 | compensation film |
| 517 | compensation film |
| 519 | compensation film |
| 601 | first optically anisotropic layer |
| 603 | second optically anisotropic layer |
| 605 | alignment layer |
| 607 | second plane |
| 608 | first plane |
| 609 | substrate |
| 613 | arrow indicating the direction of increasing thickness of compensation film |
| 801 | first optically anisotropic layer |
| 803 | second optically anisotropic layer |
| 809 | liquid crystal cell |
| 811 | optic axis of anisotropic layer 801 |
| 813 | optic axis of anisotropic layer 803 |
| 819 | liquid crystal optic axis at the surface of the liquid crystal cell |
| 823 | transmission axis of polarizer |
| 825 | transmission axis of analyzer |
| 829 | substrate |
| 831 | polarizer |
| 833 | analyzer |
| 835 | isocontrast line corresponding to contrast ratio 10 |
| 837 | isocontrast line corresponding to contrast ratio 50 |
| 839 | isocontrast line corresponding to contrast ratio 100 |
| 851 | O-mode NW-TN-LCD according to the invention |
| 853 | substrate |
| 855 | O-mode NW-TN-LCD according to the invention |
| 901 | isocontrast line corresponding to contrast ratio 10 |
| 903 | isocontrast line corresponding to contrast ratio 50 |
| 905 | isocontrast line corresponding to contrast ratio 100 |
| d | thickness of the optically anisotropic layer |
| $d_1$ | thickness of the first optically anisotropic layer |

-continued

PARTS LIST

| | |
|---|---|
| $d_2$ | thickness of the second optically anisotropic layer |
| $d_s$ | thickness of the substrate |
| ne | extraordinary refractive index of the positively birefringent material |
| no | ordinary refractive index of the positively birefringent material |
| $ne_1$ | extraordinary refractive index of the positively birefringent material of the first optically anisotropic layer |
| $no_1$ | ordinary refractive index of the positively birefringent material of the first optically anisotropic layer |
| $ne_2$ | extraordinary refractive index of the positively birefringent material of the second optically anisotropic layer |
| $no_2$ | ordinary refractive index of the positively birefringent material of the second optically anisotropic layer |
| $ne_s$ | extraordinary index of the substrate |
| $no_s$ | ordinary index of the substrate |
| $nx_s$ | the maximum index of refraction in the plane of the substrate with the biaxial optical property |
| $ny_s$ | the minimum index of refraction in the plane of the substrate with the biaxial optical property |
| $nz_s$ | the index of refraction in the thickness direction of the substrate with the biaxial optical property |
| $R_1$ | retardation of the first optically anisotropic layer |
| $R_2$ | retardation of the second optically anisotropic layer |
| $R_{sub}$ | retardation of the substrate |
| $R_{sub1}$ | retardation of the substrate |
| $R_{sub1}$ | retardation of the substrate |
| $\alpha$ | polar viewing angle |
| $\beta$ | azimuthal viewing angle |
| $\phi$ | azimuthal angle of optic axis |
| $\theta$ | tilt angle of optic axis |
| $\theta_C$ | constant tilt angle of optic axis of optically anisotropic layers |
| $\theta_{av}$ | average tilt angle of optic axis of optically anisotropic layers |
| $\theta_{C1}$ | constant tilt angle of optic axis of the first optically anisotropic layer |
| $\theta_{C2}$ | constant tilt angle of optic axis of the second optically anisotropic layer |
| $\theta_{av1}$ | average tilt angle of optic axis of the first optically anisotropic layer |
| $\theta_{av2}$ | average tilt angle of optic axis of the second optically anisotropic layer |
| $\theta_{V1}$ | tilt angle of optic axis |
| $\theta_{V2}$ | tilt angle of optic axis |
| $\theta_{V3}$ | tilt angle of optic axis |
| $\theta_{V4}$ | tilt angle of optic axis |
| $\theta_s$ | liquid crystal tilt angle at the surfaces |

What is claimed is:

1. An optical compensation film for Ordinary-mode Normally White Twisted Nematic Liquid Crystal Display comprising, a first and a second optically anisotropic layers containing positively birefringent material disposed on a substrate, wherein the optic axis of said first optically anisotropic layer tilts in a first plane with an average tilt angle between 10° and 60°, and the optic axis of said second optically anisotropic layer tilts in a second plane with an average tilt angle between 0° and 30°, the difference between said average tilt angle of said first optically anisotropic layer and said average tilt angle of said second optically anisotropic layer is larger than 10°;

said first and said second planes are perpendicular to the plane of said optical compensation film with the angle between said first and said second planes being 90±10°, and the retardation defined by $(ne_1-no_1)d_1$ of said first optically anisotropic layer is between 60 nm and 220 nm and the retardation defined by $(ne_2-no_2)d_2$ of the said second optically anisotropic layers is between 85 nm and 210 nm, where $ne_1$ and $no_1$ are extraordinary and ordinary indices of refraction of said positively birefringent material of said first optically anisotropic layer, respectively, and $ne_2$ and $no_2$ are extraordinary and ordinary indices of refraction of said positively birefringent material of said second optically anisotropic layer, respectively, and $d_1$ and $d_2$ are thickness of the said first and said second optically anisotropic layer, respectively, wherein said substrate is a negative C-plate and the out-of-plane retardation defined by $(ne_s-no_s)d_s$ of said substrate is between −200 nm and −60 nm, where $ne_s$ and $no_s$ are extra ordinary and ordinary indices of refraction of said substrate, respectively, and $d_s$ is the thickness of said substrate, or a biaxial plate satisfying both relations (1) and (2):

Relation (1)

$nx_s > ny_s > nz_s$

Relation (2)

$(nx_s - ny_s)/(nx_s + ny_s) \leq 005$, where $nx_s$ is the maximum index of refraction and $ny_s$ is the minimum index of refraction both in the plane of said substrate, and $nz_s$ is the index of refraction in the thickness direction of said substrate, and the out-of-plane retardation defined by $\{nz_s - (nx_s + ny_s)/2\}$ is between −200 nm and −60 nm.

2. An optical compensation film according to claim 1 wherein both said first and said second optically anisotropic layers are disposed on one substrate.

3. An optical compensation film according to claim 2 wherein said first optically anisotropic layer is disposed on said substrate and said second optically anisotropic layer is disposed on said first optically anisotropic layer.

4. An optical compensation film according to claim 2 wherein an alignment layer is disposed on at least one of the two sides of said first optically anisotropic layer.

5. An optical compensation film according to claim 4 wherein the alignment layer contains a material suitable to permit orientation by a photo-alignment method.

6. An optical compensation film according to claim 4 wherein the alignment layer contains a material suitable to permit orientation by a mechanical rubbing.

7. An optical compensation film according to claim 1 wherein at least one of said first or said second optically anisotropic layers contains polymer liquid crystal.

8. An optical compensation film according to claim 1 wherein the average tilt angle of said first optically anisotropic layer is between 15° and 50° and the average tilt angle of said second optically anisotropic layer is between 0° and 20°.

9. An optical compensation film according to claim 1 wherein the retardation of said first optically anisotropic layer is between 70 nm to 190 nm and the retardation of said second optically anisotropic layer is between 85 nm to 170 nm.

10. An optical compensation film according to claim 1 wherein said compensation film is made by lamination two films, and each of said films comprises an optically anisotropic layer disposed on a substrate.

11. An optical compensation film according to claim 10 wherein the lamination is done between the surfaces of said optically anisotropic layers of said two films.

12. An optical compensation film according to claim 10 wherein the lamination is done between the surface of optically anisotropic layer of the first of said two films and surface of the substrate of the second of said two films.

13. An optical compensation film according to claim 10 wherein the sum of the out-of-plane retardations of the substrates of said two films is between −200 nm to −60 nm.

14. An optical compensation film according to claim 1 wherein the tilt angle varies in at least one of said first and said second optically anisotropic layers.

15. An optical compensation film according to claim 1 wherein the tilt angle is constant in at least one of said first and said second optically anisotropic layers.

16. An optical compensation film according to claim 1 wherein the azimuthal angle of the optic axis in said first optically anisotropic layer is constant with ±10°, and the azimuthal angle of the optic axis in said second optically anisotropic layer is constant with ±10°.

17. An optical compensation film according to claim 1 wherein $ne_1$ and $ne_2$ are substantially the same and $no_1$ and $no_2$ are the substantially the same.

18. An optical compensation film according to claim 1 wherein the difference between said average tilt angle of said first optically anisotropic layer and said average tilt angle of said second optically anisotropic layer is larger than 25° but not more than 60°.

19. An optical compensation film according to claim 1 wherein said first plane contains the optic axis of liquid crystal on the liquid crystal cell surface nearest to said compensation film.

20. An optical compensation film according to claim 1 wherein the retardation of said first optically anisotropic layer is between 70 nm to 190 nm and the retardation of said second optically anisotropic layer is between 85 nm to 170 nm.

21. An optical compensation film according to claim 1 wherein $ne_1$ and $ne_2$ substantially the same and $no_1$ and $no_2$ are substantially the same.

22. A display comprising a) a Twisted Nematic Liquid Crystal cell, b) at least one polarizing element, and c) an optical compensation film according to claim 1.

23. A display comprising a) a Twisted Nematic Liquid Crystal cell, b) at least one polarizing element, and c) an optical compensation film according to claim 19.

24. A display according to claim 22 wherein compensation film is disposed on the both sides of Twisted Nematic Liquid Crystal cell.

* * * * *

UNITED STATES PATENT AND TRADEMARK OFFICE
CERTIFICATE OF CORRECTION

PATENT NO. : 6,805,924 B1
DATED : October 19, 2004
INVENTOR(S) : Tomohiro Ishikawa et al.

It is certified that error appears in the above-identified patent and that said Letters Patent is hereby corrected as shown below:

Column 16,
Line 16, insert -- $\leq 0.05$ -- in place of "$\leq 005$"

Signed and Sealed this

Nineteenth Day of July, 2005

JON W. DUDAS
*Director of the United States Patent and Trademark Office*